United States Patent
Ichiki et al.

(10) Patent No.: US 8,977,873 B2
(45) Date of Patent: Mar. 10, 2015

(54) INFORMATION PROCESSING APPARATUS AND CONTROL METHOD FOR SELECTING OPERATION MODE BASED ON A PROCESSING LOAD AND SIGNIFICANCE LEVEL OF RECEIVED DATA TO OPERATE A TRANSMITTER WITH A PROPER PERFORMANCE MARGIN

(75) Inventors: Hiroki Ichiki, Kawasaki (JP); Akiko Yamada, Kawasaki (JP); Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 250 days.

(21) Appl. No.: 13/366,943

(22) Filed: Feb. 6, 2012

(65) Prior Publication Data
US 2012/0210142 A1    Aug. 16, 2012

(30) Foreign Application Priority Data
Feb. 14, 2011 (JP) ................. 2011-028538

(51) Int. Cl.
G06F 1/26 (2006.01)
G06F 1/32 (2006.01)
H04L 12/54 (2013.01)
H04L 12/46 (2006.01)

(52) U.S. Cl.
CPC .............. *G06F 1/3209* (2013.01); *H04L 12/56* (2013.01); *G06F 1/26* (2013.01); *H04L 12/4641* (2013.01)
USPC ....................................................... 713/320

(58) Field of Classification Search
CPC .............. G06F 1/26; G06F 1/32; H04L 12/56; H04L 12/46
See application file for complete search history.

(56) References Cited

U.S. PATENT DOCUMENTS

| | | | | |
|---|---|---|---|---|
| 5,802,305 A | * | 9/1998 | McKaughan et al. | 709/227 |
| 7,603,574 B1 | * | 10/2009 | Gyugyi et al. | 713/300 |
| 8,127,162 B2 | * | 2/2012 | Satoh | 713/322 |
| 8,514,741 B2 | * | 8/2013 | Yazaki et al. | 370/253 |
| 2003/0163581 A1 | * | 8/2003 | Moran et al. | 709/235 |
| 2004/0264396 A1 | * | 12/2004 | Ginzburg et al. | 370/311 |

(Continued)

FOREIGN PATENT DOCUMENTS

| | | |
|---|---|---|
| EP | 2259509 A1 | 12/2010 |
| JP | 2005-005918 | 1/2005 |

(Continued)

OTHER PUBLICATIONS

JPOA—Office Action issued for Japanese Patent Application No. 2011-028538 mailed Jun. 24, 2014 Translation of relevant part: p. 1 line 20 to p. 2 line 3, and p. 2 line 14 to 26.

(Continued)

*Primary Examiner* — Thomas Lee
*Assistant Examiner* — Zhipeng Wang
(74) *Attorney, Agent, or Firm* — Fujitsu Patent Center

(57) ABSTRACT

In an information processing apparatus, a transmitter forwards received data. A significance determination unit determines significance of the received data. Based on the significance of the received data, an operation mode selection unit selects which operation mode to apply. Power management information stored in a memory describes what power management is to be performed in each different operation mode. A control unit performs power management of the transmitter, with reference to the stored power management information corresponding to the selected operation mode.

8 Claims, 33 Drawing Sheets

(56) References Cited

U.S. PATENT DOCUMENTS

| | | | |
|---|---|---|---|
| 2005/0238051 A1* | 10/2005 | Yi et al. | 370/469 |
| 2005/0283552 A1* | 12/2005 | Kobashi et al. | 710/114 |
| 2006/0067335 A1* | 3/2006 | Maya et al. | 370/397 |
| 2006/0104348 A1* | 5/2006 | Chen et al. | 375/240.01 |
| 2010/0070688 A1* | 3/2010 | Lin | 711/103 |
| 2012/0066520 A1 | 3/2012 | Hsin et al. | |

FOREIGN PATENT DOCUMENTS

| | | |
|---|---|---|
| JP | 2008-104233 | 5/2008 |
| JP | 2009-159429 A | 7/2009 |
| JP | 2010-034738 A | 2/2010 |
| JP | 2010-147744 | 7/2010 |
| JP | 2010-148088 A | 7/2010 |
| JP | 2010-206467 A | 9/2010 |
| JP | 2010-283828 | 12/2010 |
| JP | 2011-009953 | 1/2011 |
| JP | 2011-193059 | 9/2011 |
| JP | 2011-259221 | 12/2011 |
| WO | 2011/007437 A1 | 1/2011 |

OTHER PUBLICATIONS

JPOA—Japanese Patent Office Action issued on Dec. 16, 2014 for corresponding Japanese Application No. 2011-028538, with partial English language translation.

* cited by examiner

FIG. 9

121 FLOW DISCRIMINATION TABLE

| PHYSICAL INPUT PORT # | SOURCE MAC ADDRESS | DEST'N MAC ADDRESS | USER PRI-ORITY | SOURCE IP ADDRESS | DEST'N IP ADDRESS | IP PRO-TOCOL NUMBER | SOURCE IP PORT NUMBER | DEST'N IP PORT NUMBER | DSCP | FLOW ID | SIGNIFI-CANCE TABLE ADDRESS |
|---|---|---|---|---|---|---|---|---|---|---|---|
| phy_port #1 | mac_add #1 | mac_add #3 | 2 | IP_add #1 | IP_add #5 | IP_protocol #1 | IP_port #1 | IP_port #5 | 2 | 1 | add#0 (HIGH) |
| phy_port #1 | mac_add #1 | mac_add #4 | 0 | IP_add #2 | IP_add #6 | IP_protocol #2 | IP_port #2 | IP_port #6 | 0 | 2 | add#2 (LOW) |
| phy_port #2 | mac_add #2 | mac_add #3 | 1 | IP_add #3 | IP_add #7 | IP_protocol #3 | IP_port #3 | IP_port #7 | 1 | 3 | add#1 (MIDDLE) |
| phy_port #2 | mac_add #2 | mac_add #4 | 2 | IP_add #4 | IP_add #8 | IP_protocol #4 | IP_port #4 | IP_port #8 | 2 | 4 | add#0 (HIGH) |
| ... | ... | ... | ... | ... | ... | ... | ... | ... | ... | ... | ... |

FIG. 11

123 PERFORMANCE CONTROL TABLE

| THRESHOLD-VS-PERFORMANCE LIST#1 | THRESHOLD | 100 | | | | | |
|---|---|---|---|---|---|---|---|
| | PERFORMANCE | 100 | | | | | |
| THRESHOLD-VS-PERFORMANCE LIST#2 | THRESHOLD | 25 | 55 | 100 | | | |
| | PERFORMANCE | 40 | 70 | 100 | | | |
| THRESHOLD-VS-PERFORMANCE LIST#3 | THRESHOLD | 5 | 15 | 35 | 55 | 75 | 100 |
| | PERFORMANCE | 10 | 20 | 40 | 60 | 80 | 100 |

FIG. 13

124   TRAFFIC MANAGEMENT TABLE

| FLOW ID | FLOW SIGNIFICANCE | INPUT PORT | EGRESS EDGE NODE | INCOMING TRAFFIC VOLUME | TRANSMIT DISTRIBUTION TABLE |
|---|---|---|---|---|---|
| 1 | LOW | phy_port#1 | NODE5 | 20 | Table#1 |
| 2 | HIGH | phy_port#1 | NODE6 | 20 | Table#2 |
| ... | ... | ... | ... | ... | ... |

FIG. 14

TRANSMIT DISTRIBUTION TABLE 125a  125b  125c

Table#1

| OUTPUT PORT | ADJACENT NODE | TRAFFIC ATTRAC-TIVENESS | TRANSMIT PROBA-BILITY | OUTGOING TRAFFIC VOLUME |
|---|---|---|---|---|
| phy_port#3 | NODE3 | 6 | 0.6 | 12 |
| phy_port#4 | NODE4 | 4 | 0.4 | 8 |

FIG. 25

124-1 TRAFFIC MANAGEMENT TABLE

| FLOW ID | FLOW SIGNIFICANCE | INPUT PORT | EGRESS EDGE NODE | TRAFFIC HISTORY TABLE | TRANSMIT DISTRIBUTION TABLE |
|---|---|---|---|---|---|
| 1 | HIGH | phy_port#1 | NODE3 | sheet#11 | Table#21 |
| 2 | MIDDLE | phy_port#1 | NODE3 | sheet#12 | Table#22 |
| ... | ... | ... | ... | ... | ... |

FIG. 27

TRANSMIT DISTRIBUTION TABLE 125d  125e  125f

Table#21

| OUTPUT PORT | ADJACENT NODE | ATTRACTIVENESS MANAGEMENT TABLE |
|---|---|---|
| 2 | NODE E | |
| 3 | NODE F | sheet#31 |
| ⋮ | ⋮ | |

FIG. 28

ATTRACTIVENESS HISTORY TABLE 129a 129b 129c sheet#31

|  | CURRENT CALCULATION VALUE | PREVISOUS CALCULATION VALUE |
| --- | --- | --- |
| OUTPUT PORT2 ATTRACTIVENESS | 8 | 6 |
| OUTPUT PORT2 TRANSMIT PROBABILITY | 0.8 | 0.6 |
| OUTPUT PORT3 ATTRACTIVENESS | 2 | 4 |
| OUTPUT PORT3 TRANSMIT PROBABILITY | 0.2 | 0.4 |
| ⋮ | ⋮ | ⋮ |

US 8,977,873 B2

INFORMATION PROCESSING APPARATUS AND CONTROL METHOD FOR SELECTING OPERATION MODE BASED ON A PROCESSING LOAD AND SIGNIFICANCE LEVEL OF RECEIVED DATA TO OPERATE A TRANSMITTER WITH A PROPER PERFORMANCE MARGIN

CROSS-REFERENCE TO RELATED APPLICATION

This application is based upon and claims the benefit of priority of the prior Japanese Patent Application No. 2011-028538, filed on Feb. 14, 2011, the entire contents of which are incorporated herein by reference.

FIELD

The embodiments discussed herein relate to an information processing apparatus that transfers data, a control method therefor, and a computer-readable medium encoded with a computer program therefor.

BACKGROUND

A network system includes a plurality of nodes that transport data packets from a source computer to a destination computer. These network nodes exchange their routing information with each other to recognize what path (route) is used to deliver each packet to its destination. Routing information sent from a node indicates transmission paths that the sending node recognizes. Based on the routing information received from other nodes, each node selects forwarding directions according to the destination of individual packets.

A node may have a plurality of transmission paths to reach the destination computer. In that case, the node chooses one of them by using the algorithms specified in routing protocols such as Open Shortest Path First (OSPF) and Routing Information Protocol (RIP). Basically these routing protocols seek and select the shortest paths between nodes. For more sophisticated control, some existing routing protocols try to smooth out unevenness of traffic to minimize the peak network usage while seeking the shortest paths.

Data is transported over a network in the form of packets. With the conventional routing protocols noted above, the traffic of packets is forwarded along previously determined paths. Every node on the network has thus to be active even in a period when the overall amount of traffic is small.

With the enhancement of performance in network processing, the communication devices used in recent network systems consume more power than before. This leads to an increased importance of techniques for managing power consumption of a network system as a whole. For example, the dynamic voltage scaling (DVS) technique may be applied for the purpose of power conservation in routers and other network devices. DVS controls power consumption by varying supply voltage and operating clock. For example, the power supply voltage and operating clock frequency are lowered to reduce the power consumption when the device is under light load conditions.

Some recent routers are designed to go into a suspended state when the traffic is absent. This feature of routers may be used to save the power of a network. That is, the traffic on a network may be consolidated into a small number of paths, causing some routers to receive no incoming traffic to process. Those inactive routers are allowed to reduce their power consumption by entering a suspended state.

For example, there is a technique that ensures consolidation of network traffic into a limited number of paths. According to this technique, an alarm is raised when the amount of traffic on a link exceeds a specific threshold. The alarm information is transmitted from the source router of the traffic on that link to other routers, and the receiving routers change their packet forwarding mode from consolidation mode to distribution mode to distribute the traffic again to a plurality of paths. This technique prevents the traffic consolidation from causing congestion. See, for example, Japanese Laid-open Patent Publication No. 2010-206467.

It takes a long time, however, for nodes to recover from power-saving state to normal operation state to deal with an increased amount of traffic. This may lead to quality degradation such as transmission delays. The network system actually transports various groups of data with different tolerance levels for quality degradation. A problem arises when the quality degradation of some transmitted data exceeds its tolerance level.

SUMMARY

In one aspect of the embodiments, there is provided an information processing apparatus including the following elements: a transmitter that forwards received data; a memory configured to store power management information describing what power management is to be performed in each different operation mode; and a processor configured to perform a procedure including: determining significance of the received data, selecting which operation mode to apply, based on the significance of received data, and performing power management of the transmitter, with reference to the stored power management information corresponding to the selected operation mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example data structure of a flow discrimination table;

FIG. 11 illustrates an example data structure of a performance control table;

FIG. 13 illustrates an example data structure of a traffic management table;

FIG. 14 illustrates an example data structure of transmit distribution tables;

FIG. 25 illustrates an example data structure of a traffic management table according to the third embodiment;

FIG. 27 illustrates an example data structure of a transmit distribution table according to the third embodiment;

FIG. 28 illustrates an example data structure of an attraction history table;

DESCRIPTION OF EMBODIMENTS

Figure 1:
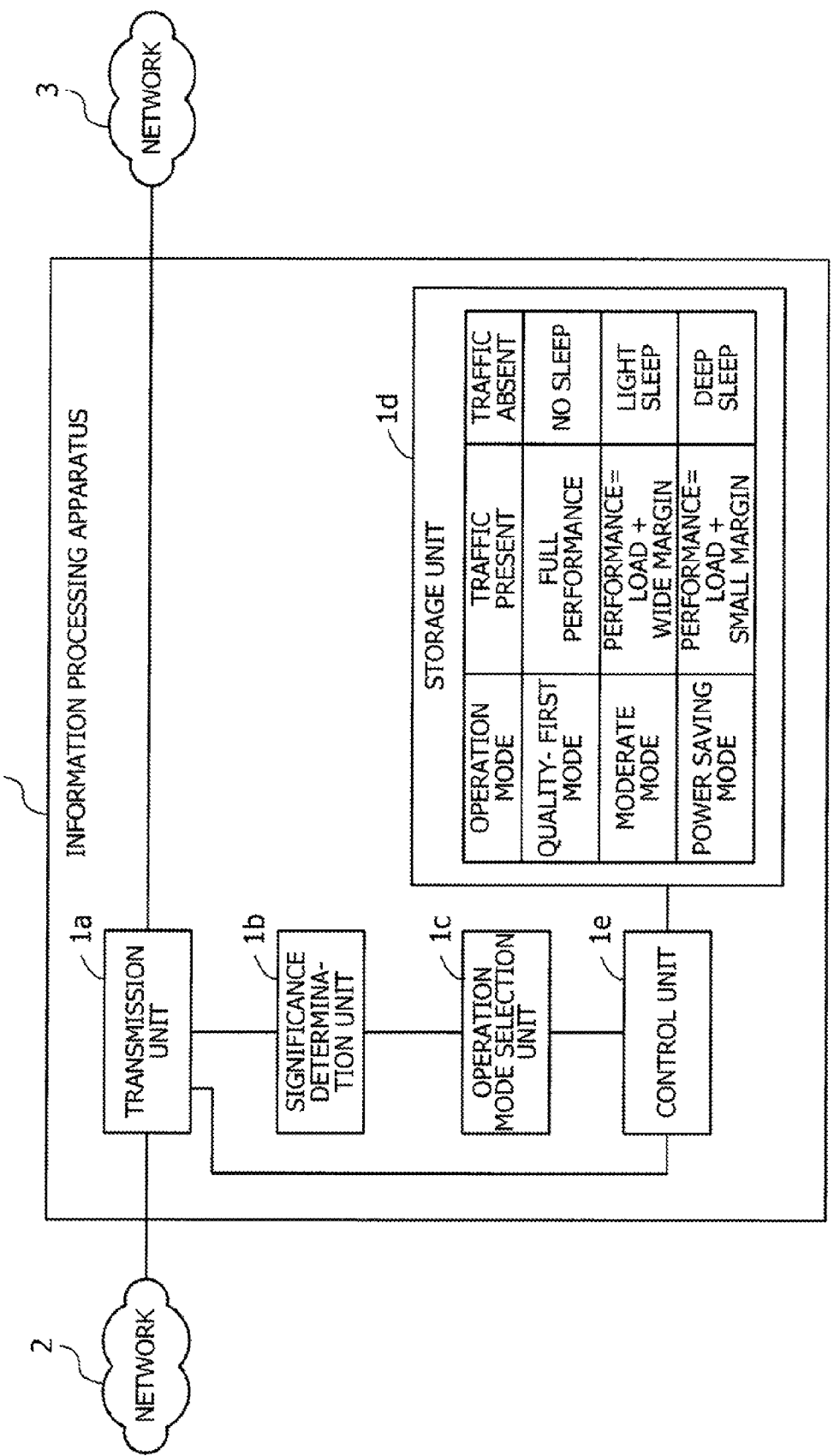
FIG. 1 illustrates an example of a functional structure of an apparatus according to a first embodiment.

Several embodiments will be described below with reference to the accompanying drawings, wherein like reference numerals refer to like elements throughout.

These embodiments may be combined with each other as long as there is no contradiction between them.

(a) First Embodiment

FIG. 1 illustrates an example functional structure of an apparatus according to a first embodiment. The illustrated information processing apparatus 1 transfers data between two networks 2 and 3. To this end, the information processing apparatus 1 includes the following elements: a transmission unit 1a, a significance determination unit 1b, an operation mode selection unit 1c, a storage unit 1d, and a control unit 1e. The solid lines interconnecting boxes in FIG. 1 represent communication paths between the elements. It should be appreciated that there may be other communication paths than those seen in FIG. 1.

The transmission unit 1a receives incoming data and transfers the received data to other places. For example, the transmission unit 1a receives incoming data from one network 2 and transfers the received data to another network 3. The transmission unit 1a may also receive data from the latter network 3 and transfer the received data to the former network 2.

The significance determination unit 1b determines significance of received data. For example, the significance determination unit 1b determines significance of received data from its traffic class field or type of service (ToS) field or both of them. Traffic class field and ToS field are part of the header of packets conveying data and used to set a priority to the packets. For example, the significance determination unit 1b may determine that data carried by high-priority packets is of a high significance.

The operation mode selection unit 1c determines which operation mode to apply, on the basis of the significance of each series of received data. For example, the operation mode selection unit 1c evaluates the significance of each series of received data and selects an operation mode corresponding to the highest significance that is found.

Suppose here that the significance of data is classified into the following three levels: high, medium, and low. Then, the high, medium, and low significance levels are then associated with, for example, quality-first mode, moderate mode, and power saving mode, respectively. The operation mode selection unit 1c determines which data is the most significant of all, and what significance level it is. When the most significant data is of a high significance, the operation mode selection unit 1c selects "quality-first mode" for the operation mode to apply. When it is of a medium significance, the operation mode selection unit 1c selects "moderate mode" for the operation mode to apply. When it is of a low significance, the operation mode selection unit 1c selects "power saving mode" for the operation mode to apply.

The storage unit 1d stores information about in each different operation mode. For example, the storage unit 1d stores information describing how to conserve the power when there is incoming traffic, as well as when there is no incoming traffic, in each different operation mode. Referring to the example of FIG. 1, the stored information indicates that, when incoming traffic is present, the performance of the transmission unit 1a is controlled in different ways depending on the operation mode. Specifically, the transmission unit 1a is expected to deliver its full (100%) performance in quality-first mode. In moderate mode, the transmission unit 1a is to operate with a wide performance margin against the load. In power saving mode, the transmission unit 1a is to operate with a small performance margin against the load. The stored information also indicates that, when incoming traffic is absent, the sleep mode of the transmission unit 1a is controlled in different ways depending on the operation mode. That is, the transmission unit 1a never sleeps in quality-first mode even if it has no incoming traffic. In moderate mode, the transmission unit 1a enters light sleep mode. In power saving mode, the transmission unit 1a goes into deep sleep mode.

With reference to the information stored in the storage unit 1d, the control unit 1e manages power consumption of the transmission unit 1a according to the operation mode applied thereto. For example, the stored information may specify at what performance level the transmission unit 1a is to operate in a specific operation mode. The control unit 1e then manages power consumption of the transmission unit 1a in such a way that the specified performance level is achieved. For example, the performance of the transmission unit 1a may be varied by changing its operating clock frequency. The control unit 1e may also vary the supply voltage of the transmission unit 1a to control its performance.

In operation of the information processing apparatus 1 described above, the significance determination unit 1b determines significance of data received from the network 2. Then, on the basis of the significance of each inflow of data, the operation mode selection unit 1c selects which operation mode to apply to the transmission unit 1a. The control unit 1e applies the selected operation mode to the transmission unit 1a and performs power management according to the selected operation mode.

The above control enables power management of the transmission unit 1a according to the significance of received data. For example, when there is an inflow of data with a high significance, the power management is performed in an operation mode that gives priority to the quality of data transmission, thus preventing the data from degradation. When the significance of received data does not go beyond a medium level, the power management is performed in moderate operation mode to reduce the power consumption without sacrificing transmission quality too much. When there are only low-significance data inflows, the power management is performed in an operation mode that gives priority to power saving, thus achieving a large reduction of power consumption while tolerating some degradation of transmission quality.

The above-described transmission unit 1a, significance determination unit 1b, operation mode selection unit 1c and control unit 1e may be implemented as functions performed by a central processing unit (CPU) in the information processing apparatus 1. Also the above-described storage unit 1d may be implemented by using a random access memory (RAM) or a hard disk drive (HDD) in the information processing apparatus 1 or their combination.

(b) Second Embodiment

A second embodiment will now be described below. The foregoing first embodiment is directed to a data transmission technique with power management functions. Many network systems use packet-based data transmission techniques. The second embodiment is directed to a packet-based network system employing routers to deliver packets via appropriate paths. The following description uses the term "node" to refer to a router that forwards packets in the network, and the term "flow" to refer to a set of packet traffic from a specific source to a specific destination.

The second embodiment is designed to determine the operational characteristics of nodes and select sleep levels depending on the highest significance of passing flows (referred to as the "maximum significance"). A node has to be active when there is an incoming traffic in at least one of the passing flows of that node. When the passing traffic reduces to zero, the node goes into sleep mode. The degree of sleep (sleep level) may be determined in accordance with the maximum significance of passing flows.

Figure 2:
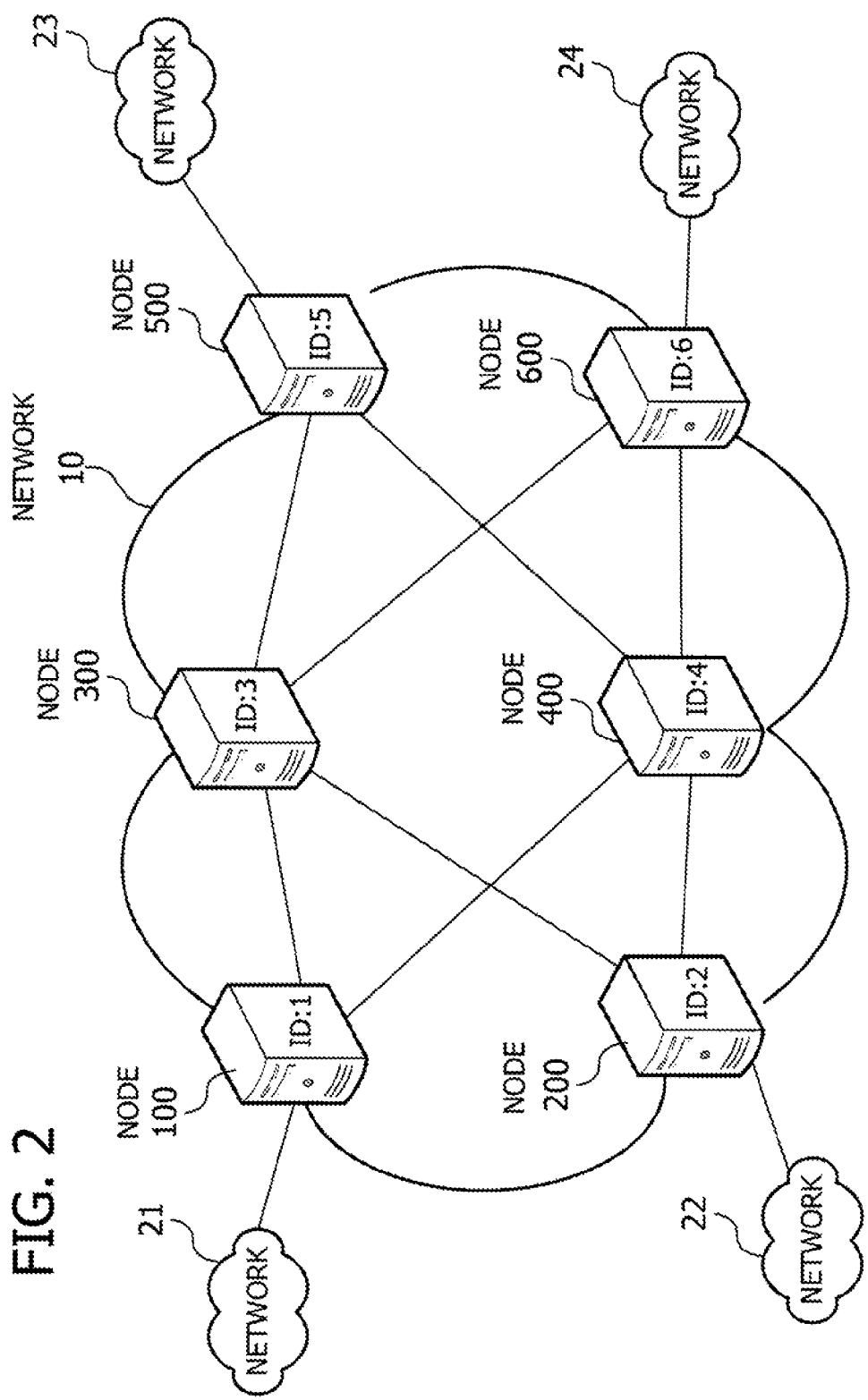
FIG. 2 illustrates an example system configuration according to a second embodiment.

FIG. 2 illustrates an example system configuration according to the second embodiment. The illustrated network 10 is formed from a plurality of nodes 100, 200, 300, 400, 500, and 600. Some nodes in the network 10 are connected to other networks. Specifically, four nodes 100, 200, 500, and 600 are connected to networks 21 to 24, respectively. The nodes 100, 200, 500, and 600 transport incoming traffic from and outgoing traffic to the other networks, in addition to handling internal traffic within the network 10. Because of their roles of linking to other networks, the nodes 100, 200, 500, and 600 are referred to as "edge nodes."

Some edge nodes receive incoming traffic from other networks and forwards it over the network 10. These nodes are referred to as "ingress nodes." Similarly, some edge nodes receive and forward outgoing traffic from the network 10 to other networks. These nodes are referred to as "egress nodes." Edge nodes may function as both ingress nodes and egress nodes, depending on in which direction the traffic is forwarded.

The remaining nodes 300 and 400 forward traffic within the network 10. These nodes are referred to as "relaying nodes." The nodes 300 and 400 are each connected to nodes 100, 200, 500, and 600 to forward the traffic between them.

The nodes are each given an identifier (ID) to distinguish them from each other in the network 10. For example, one node 100 has an ID of "1," while another node 200 has an ID of "2." Other nodes 300, 400, 500, and 600 are similarly identified by their respective IDs "3," "4," "5," and "6." Each node in the network 10 selects transmission paths on a packet-by-packet basis, for example. Edge nodes also serve as relaying nodes to deliver packets in the network 10.

The above-described system transports packet traffic in the network 10. The following description of the second embodiment assumes that the traffic flowing into nodes 100 and 200 is forwarded to nodes 500 and 600. Transmission paths of this incoming traffic are previously defined in the ingress nodes 100 and 200 and used to transport packets to the egress nodes 500 and 600.

As noted above, two nodes 100 and 200 serve as the ingress nodes of traffic from other networks 21 and 22, while another two nodes 500 and 600 serve as the egress nodes to another network 23 in the context of the second embodiment. Nodes 300 and 400 serve as the relaying nodes to forward the traffic over the network 10. In the case where the system uses a routing method that delivers packets according to specified paths, the ingress nodes 100 and 200 are configured with routing information describing one or more paths for each section (or each pair of ingress and egress nodes). The ingress nodes 100 and 200 distribute their received traffic to such predefined paths at specified forwarding probabilities.

The nodes may go into sleep mode individually when there is no incoming traffic for a specified time. Sleep mode reduces power consumption in the nodes by suspending many of their functions. Several different sleep modes may be implemented in the nodes. For example, the nodes may go into light sleep mode or deep sleep mode. While many functions are stopped, the deep sleep mode still maintains the function of sending and receiving control packets.

Each node is capable of managing its own power consumption by controlling supply voltages and clock frequencies. The power management may be performed at several different levels in terms of performance control. For example, the nodes may go into low-power mode by reducing their operating frequencies to reduce the power consumption when there is no incoming traffic for a specified time.

The second embodiment consolidates network traffic by using "attractiveness." More specifically, each node informs adjacent nodes of its own attractiveness. A node asserts a greater attractiveness as it transfers a larger amount of traffic. When the information received from an adjacent node indicates a greater attractiveness than others', the receiving node modifies its routing decisions in such a way that packets will be forwarded to that adjacent node with an increased probability. As this processing is repeated, network traffic is consolidated into fewer paths on which the nodes are forwarding packets more actively. An example of such attractiveness-based traffic consolidation techniques is disclosed by Japanese Laid-open Patent Publication No. 2010-206467.

Figure 3:
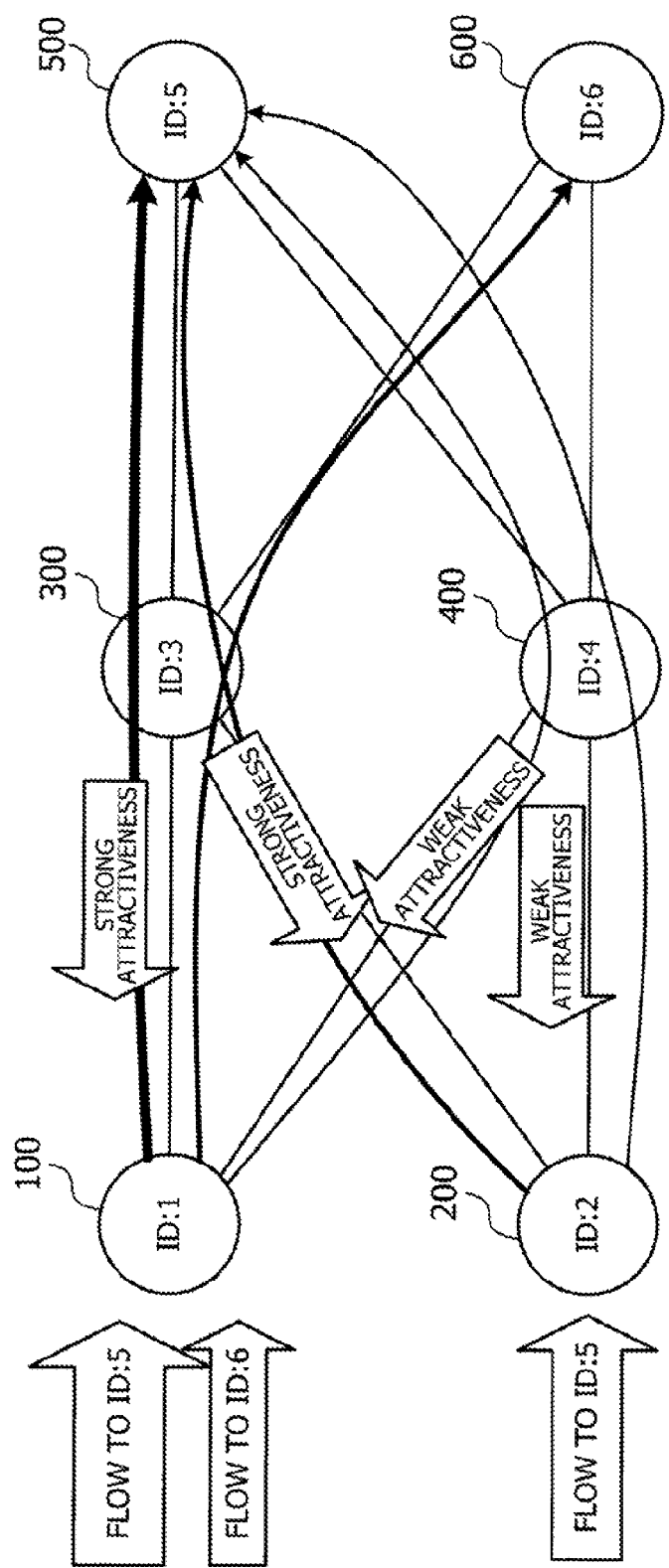
FIG. 3 explains an attractiveness-based traffic consolidation technique by way of example.

FIG. 3 explains an attractiveness-based traffic consolidation technique by way of example. As seen in FIG. 3, one node 100 receives two packet flows from a network while another node 200 receives one packet flow from another network 22. The former two flows are directed respectively to two egress nodes 500 and 600. The latter one flow goes to the former egress node 500.

It is assumed here that the ingress node 100 forwards packet flows to the egress node 500 via two paths that run through different relaying nodes 300 and 400. It is also assumed that the ingress node 100 uses only one path to forward packet flows to the egress node 600. This path runs through the relaying node 300. It is further assumed that the node 200 forwards packet flows to the egress node 600 via two paths that run through different relaying nodes 300 and 400.

As indicated by the line widths of arrows in the example of FIG. 3, the ingress node 100 uses the two paths to the egress node 500 unevenly, such that more packets of the received flow are directed to the relaying node 300. Similarly, the ingress node 200 distributes more packets of the received flow to the relaying node 300 on the way to the egress node 500.

The two relaying nodes 300 and 400 send their respective attractiveness according to the amount of incoming traffic that they receive. The information goes to their adjacent nodes 100 and 200 located upstream on each path. In the example of FIG. 3, one relaying node 300 sends a stronger attractiveness than the other relaying node 400. Upon receipt of the attractiveness information from the relaying nodes 300 and 400, the nodes 100 and 200 further raise the ratio of packet traffic to the former relaying node 300 because of its stronger attractiveness. This results in a greater amount of traffic into the relaying node 300 and consequent enhancement of its attractiveness. The latter relaying node 400, on the other hand, receives a reduced amount of incoming traffic, which makes the node 400 less attractive. The distribution of the noted packet traffic varies over time, and the traffic flows are finally consolidated into the path running through the most attractive relaying node 300. This consolidation of traffic permits sending the other relaying node 400 into sleep mode in order to reduce its power consumption.

The problem is, however, that once a node enters sleep mode, it takes a relatively long time for the node to recover from its inactive state. For this reason, the second embodiment is designed to determine whether to put a node into sleep mode, as well as to select which level of sleep mode is appropriate for that node, taking into consideration the significance of packet flows that pass through the node. This feature of the second embodiment makes it possible to maintain the transmission quality of high-significance packet flows, while pursuing power conservation in the nodes that only transfer less significant flows and thereby reducing power consumption of the network as a whole.

The nodes may also use DVS or other control techniques to reduce their power consumption while continuing to handle incoming traffic. While the DVS-based power reduction works effectively as long as the amount of traffic is relatively small, the network traffic may increase abruptly, and the nodes have then to recover their original performance to deal with the increased traffic. If this performance control is not responsive enough, it would lead to an increased delay of packets and consequent degradation of the transmission quality. The second embodiment is therefore designed to cause a node to operate with a wide performance margin above its current processing load when the node is handling packet traffic related to high-significance flows. This feature of the second embodiment prevents quality degradation from happening even if the nodes encounter an abrupt increase of traffic related to some high-significance flow. The second embodiment, on the other hand, allows the nodes to narrow their performance margin when they are only handling low-significance traffic flows, so that power saving is achieved in the network.

Figure 4:
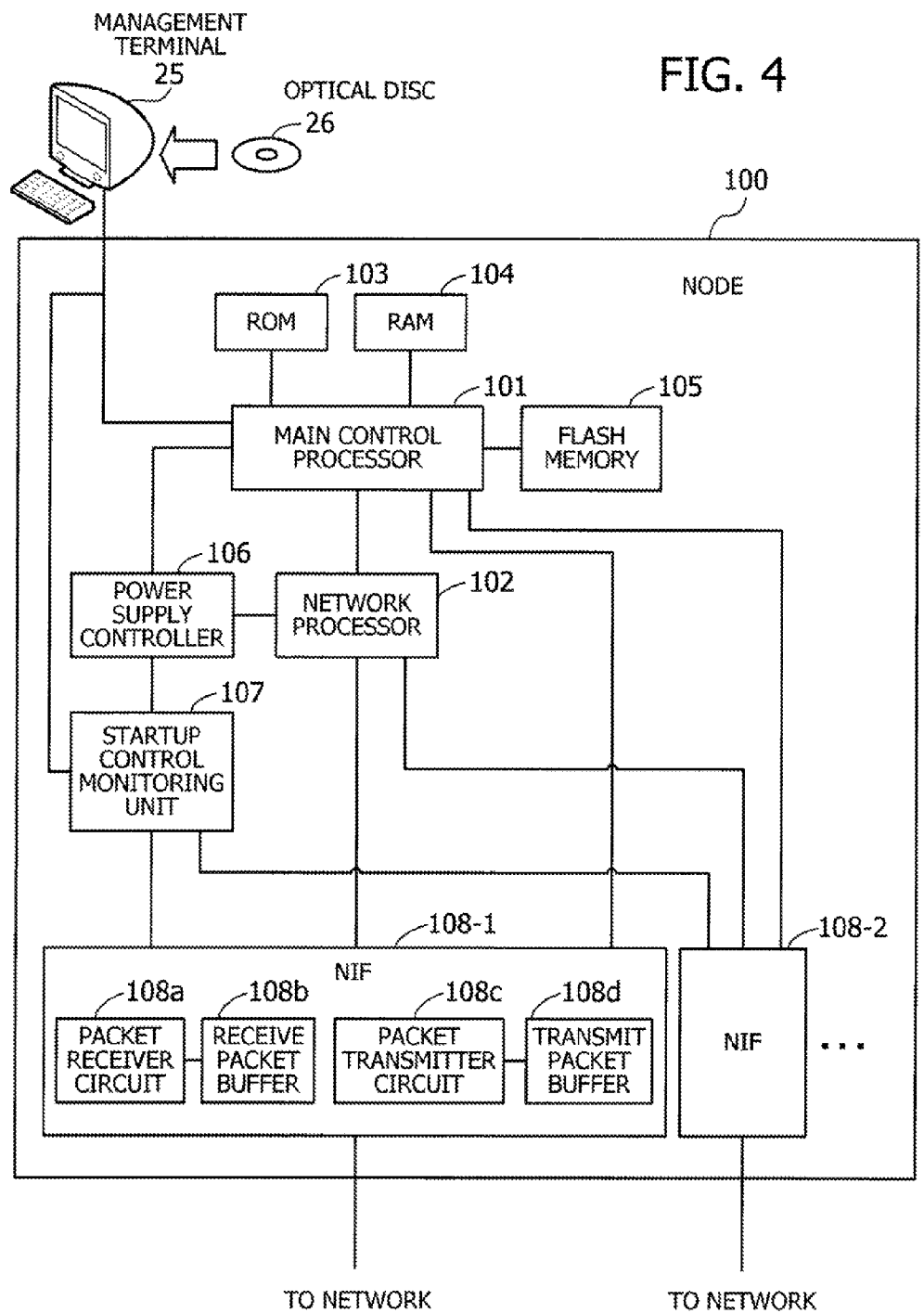
FIG. 4 illustrates an a typical hardware configuration of nodes used in the present embodiment.

FIG. 4 illustrates an a typical hardware configuration of nodes used in the present embodiment. The illustrated node 100 includes a main control processor 101, a network processor 102, a read only memory (ROM) 103, a RAM 104, a flash memory 105, a power supply controller 106, a startup control monitoring unit 107, and a plurality of network interfaces (NIF) 108-1, 108-2, and so on. The solid lines connecting boxes in FIG. 4 indicate communication paths between the elements. It should be appreciated that there may be other paths than those seen in FIG. 4.

The main control processor 101 controls the entire system of the node 100. For example, the main control processor 101 communicates with other nodes by using control packets, changes operating clock frequencies and power supply voltages, and manages sleep mode of the node. To this end, the main control processor 101 is coupled to the network processor 102, ROM 103, RAM 104, flash memory 105, power supply controller 106, and other elements.

The network processor 102 is coupled to a plurality of NIFs 108-1, 108-2, . . . to control packet forwarding operations. The ROM 103 is previously encoded with, for example, a boot program for the main control processor 101. This boot program loads configuration data and firmware programs from the flash memory 105 to the RAM 104 at the time of starting up the node. The RAM 104 serves as temporary storage of programs and data that the main control processor 101 executes and manipulates at runtime. The flash memory 105 stores, for example, firmware programs of the main control processor 101 and network processor 102, and network control data previously defined by a network administrator. Also stored in the flash memory 105 is a copy of memory data that is saved from the network processor 102 when the node enters sleep mode. The saved memory data may include what is stored in a destination lookup memory 110 and network control data memory 120 (not illustrated in FIG. 4). The flash memory 105 may further store various control data which may be transmitted and received in the form of control packets during sleep mode.

The power supply controller 106 controls power supply to the main control processor 101 and network processor 102. For example, the power supply controller 106 stops power supply to specific circuits when a command for transition to sleep mode is received from the main control processor 101. During sleep mode, the power supply controller 106 may receive a notification from the startup control monitoring unit 107 which indicates the presence of packet traffic. In that case, the power supply controller 106 resumes power supply to the sleeping circuits, thus causing them to recover from the sleep mode. The power supply controller 106 also controls supply voltages for the main control processor 101 and network processor 102 according to instructions from the main control processor 101.

The startup control monitoring unit 107 monitors the state of a plurality of NIFs 108-1, 108-2, . . . coupled thereto to detect incoming packets. For example, when a packet inflow is detected, the startup control monitoring unit 107 informs the power supply controller 106 of the presence of packet traffic.

The NIF 108-1 is connected to a peer node via a transmission line. To exchange data with that peer node, the NIF 108-1 includes a packet receiver circuit 108a, a receive packet buffer 108b, a packet transmitter circuit 108c, and a transmit packet buffer 108d. The packet receiver circuit 108a receives packets sent from the peer node, and the receive packet buffer 108b temporarily stores those received packets. The packet transmitter circuit 108c transmits packets to the peer node, and the transmit packet buffer 108d stores outgoing packets temporarily before they are transmitted. Other NIFs 108-2, . . . similarly include those functions in the NIF 108-1.

As illustrated in FIG. 4, a management terminal 25 may be attached to the node 100 to link with its main control processor 101 and startup control monitoring unit 107. This management terminal 25 is used by a network administrator responsible for the operation management of the network 10, including various setup operations on the node 100. The management terminal 25 has a built-in media drive for reading an optical disc 26, for example. This optical disc 26 is a portable data storage medium, and the recorded data is read as a reflection of light or the lack of same. The optical disc 26 may be, for example, a digital versatile disc (DVD), DVD-RAM, compact disc read-only memory (CD-ROM), CD-Recordable (CD-R), or CD-Rewritable (CD-RW). For example, the management terminal 25 reads programs and data from the optical disc 26 and supplies them to the node 100. The node 100 then stores received programs and data in its local flash memory 105.

The above-described hardware platform may be used to realize the processing functions of the second embodiment. While FIG. 4 illustrates only one node 100, the same hardware configuration may similarly apply to the other nodes 200, 300, 400, 500 and 600. It should also be appreciated that the hardware platform of FIG. 4 may be used to implement the foregoing information processing apparatus 1 according to the first embodiment.

Figure 5:
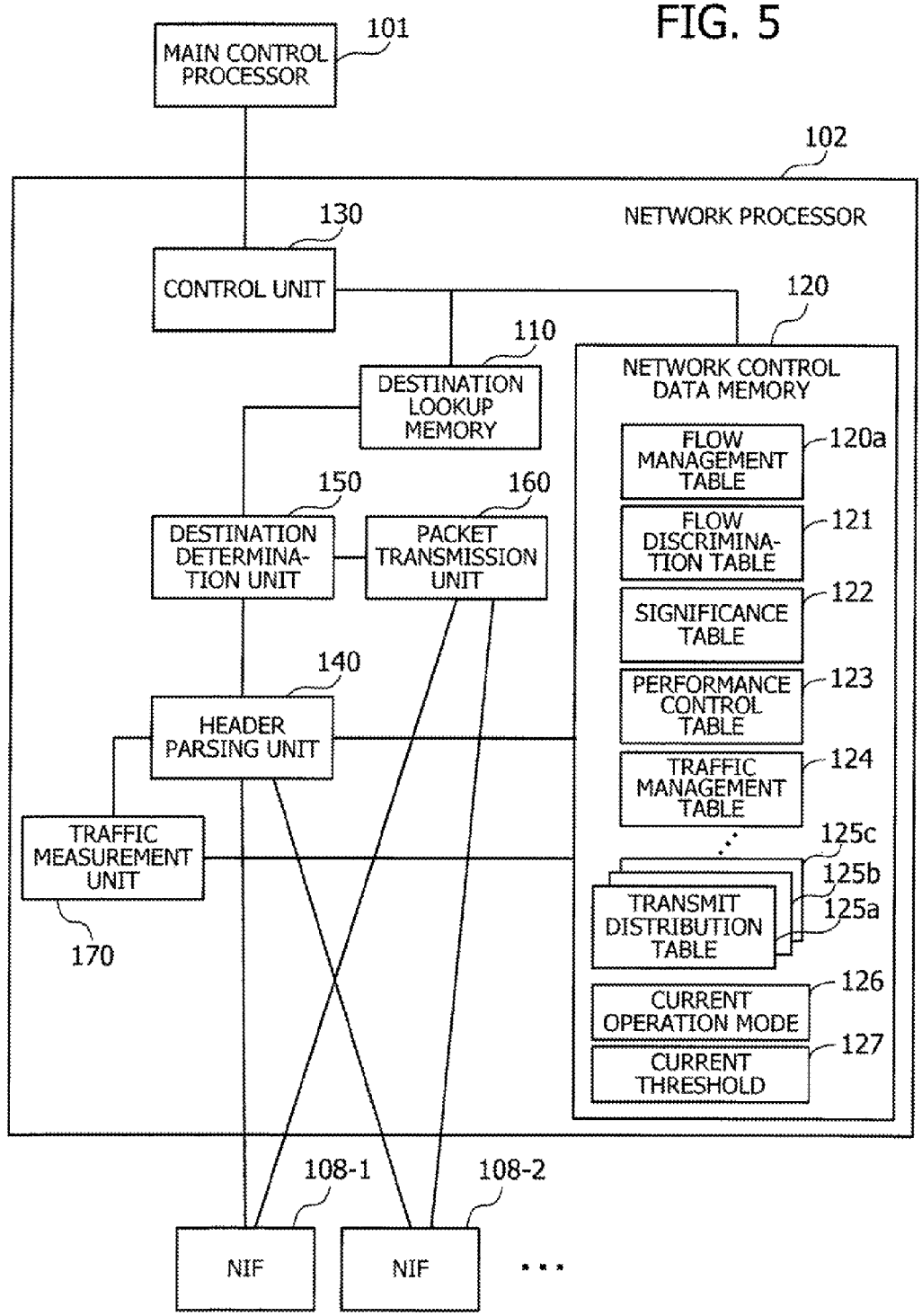
FIG. 5 is a block diagram illustrating an example of internal functions of a network processor according to the second embodiment.

FIG. 5 is a block diagram illustrating an example of internal functions of a network processor according to the second embodiment. The illustrated network processor 102 includes a destination lookup memory 110, a network control data memory 120, a control unit 130, a header parsing unit 140, a destination determination unit 150, a packet transmission unit 160, and a traffic measurement unit 170. The solid lines interconnecting boxes in FIG. 5 indicate communication paths between the elements. It should be appreciated that there may be other paths than those seen in FIG. 5.

The destination lookup memory 110 stores information that indicates correspondence between destination IP addresses and adjacent nodes. For example, the destination lookup memory 110 stores routing information obtained by using routing protocols such as OSPF and RIP. Each record stored in the destination lookup memory 110 associates, for example, IP address of a specific destination node with IP address and media access control (MAC) address of an adjacent node, as well as with port number of a physical port linked to the adjacent node.

The network control data memory 120 stores various control data used to make forwarding decisions for delivering packets. For example, the network control data memory 120 contains a flow management table 120a, a flow discrimination table 121, a significance table 122, a performance control table 123, a traffic management table 124, a plurality of transmit distribution tables 125a, 125b, 125c, . . . , a current operation mode 126, and a current threshold 127.

The flow management table 120a stores path information of each flow. Ingress nodes have this flow management table 120a in the case where the system uses a routing method that delivers packets according to specified paths.

The flow discrimination table 121 is a data table that provides information for determining flow ID and significance of packets based on their header information. The significance table 122 is a data table that indicates an operation profile and sleep level defined for each specific significance level. The performance control table 123 is a data table that indicates traffic thresholds and their corresponding performance levels defined for each specific significance level. The traffic management table 124 is a data table used to manage the amount of traffic of each flow. The transmit distribution tables 125a, 125b, 125c, . . . are a collection of data tables that indicate distribution ratios at which the packets are distributed to different paths defined for each flow. The current operation mode 126 is a parameter that indicates an operation mode applied to the node 100. For example, the current operation mode 126 may be "quality-first mode" or "moderate mode" or "power saving mode." The current threshold 127 indicates an upper limit of the load handled with the current performance level. The current threshold may be initialized to, for example, 100% when the node 100 starts up.

The control unit 130 controls packet routing operations in accordance with commands from the main control processor 101. The main control processor 101 is allowed to make access to information in the network control data memory 120 via the control unit 130.

The header parsing unit 140 analyzes header information of received packets. Based on the header information, the header parsing unit 140 determines, for example, flow ID and significance of a specific flow corresponding to the received packets.

The destination determination unit 150 receives a packet from the header parsing unit 140 and determines its destination with reference to a relevant part of the destination lookup memory 110. More specifically, the destination determination unit 150 selects an output port to which the packet is directed, as well as determining IP address and MAC address of the next adjacent node on the packet's path. The packet transmission unit 160 receives packets from the destination determination unit 150 and forwards them to NIFs accommodating output ports that the destination determination unit 150 has selected.

The traffic measurement unit 170 measures the amount of outgoing traffic per unit time for each path of flows. With those measured values, the traffic measurement unit 170 populates the transmit distribution table of each relevant path.

It is noted that the foregoing transmission unit 1a in FIG. 1 is implemented as a destination determination unit 150 and a packet transmission unit 160 in the network processor 102 of FIG. 5. The foregoing significance determination unit 1b and operation mode selection unit 1c in FIG. 1 are implemented as a header parsing unit 140 in the network processor 102 of FIG. 5. Similarly, the foregoing storage unit 1d in FIG. 1 is implemented as a network control data memory 120, and the foregoing control unit 1e in FIG. 1 is implemented as a control unit 130 in the network processor 102 of FIG. 5, in combination with the main control processor 101, power supply controller 106, and startup control monitoring unit 107 of FIG. 4.

In operation, the above-described node 100 goes into sleep mode, disabling some of its functions. The second embodiment provides two levels of sleep mode, i.e., deep sleep mode and light sleep mode. Deep sleep mode saves more power than light sleep mode while it takes a longer time to recover from the sleep and resume normal operation.

Figure 6:
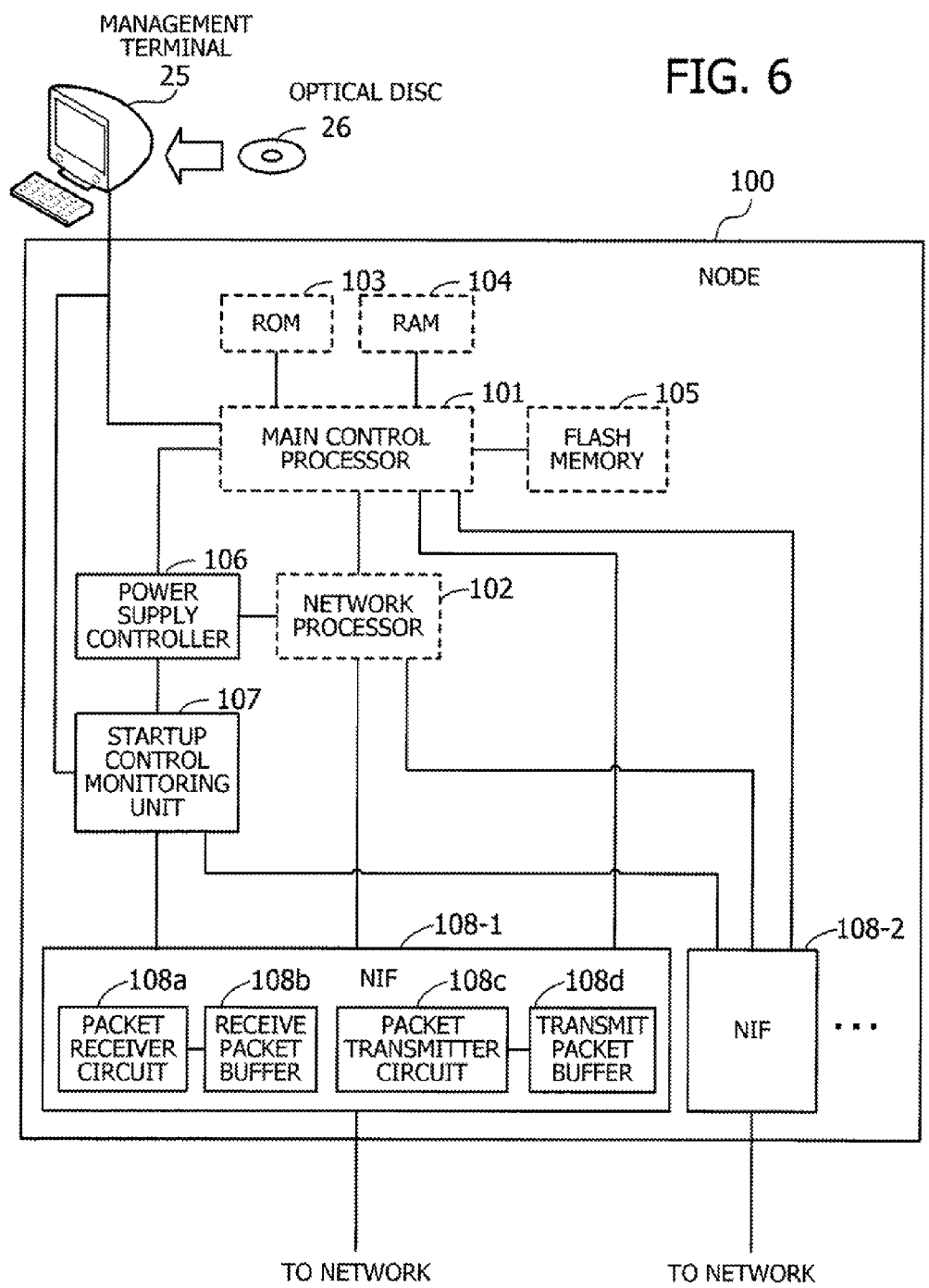
FIG. 6 gives an example of which functions are stopped in deep sleep mode.

FIG. 6 gives an example of which functions are stopped in deep sleep mode. The broken-line boxes seen in FIG. 6 represent functions that are stopped in deep sleep mode, while the solid-line boxes represent functions that are allowed to operate even in deep sleep mode. In the example of FIG. 6, the node 100 has stopped its main control processor 101, network processor 102, ROM 103, RAM 104, and flash memory 105, while keeping alive the power supply controller 106, startup control monitoring unit 107, and NIFs 108-1, 108-2, and so on.

Before the node 100 goes into deep sleep mode, the main control processor 101 obtains current data in the destination lookup memory 110 and network control data memory 120 via the control unit 130 in the network processor 102. The main control processor 101 writes the obtained data in the flash memory 105. The information in the destination lookup memory 110 and network control data memory 120 has previously been provided from the main control processor 101 to the network processor 102. It may thus be possible for the main control processor 101 to save a copy of the information in its local flash memory 105 when it is sent to the network processor 102. This implementation permits the main control processor 101 to eliminate the above-noted write operation to the flash memory 105 when the node 100 goes into deep sleep mode.

Suppose now that the node 100 is about to recover from the deep sleep mode described above. The main control processor 101 executes a firmware boot program on the ROM 103 to read firmware programs and configuration data for the main control processor 101 from the flash memory 105. Those programs and data are loaded to the RAM 104, and the main control processor 101 then starts up by executing the loaded programs on the RAM 104.

The network processor 102 may have saved the content of its destination lookup memory 110 and network control data memory 120 at the time of transition to sleep mode. When this is the case, the main control processor 101 reloads, upon completion of its startup processing, the saved data from the flash memory 105 back to the destination lookup memory 110 and network control data memory 120 in the network processor 102. The flash memory 105 retains the saved data because of its non-volatility. It is noted, however, that the data is a snapshot at the moment of transition to sleep mode, meaning that it has not been updated during the sleep. Accordingly the main control processor 101 further communicates with adjacent nodes to exchange their routing information and other control parameters by using routing protocols, thereby obtaining network topology information and specific path data. The main control processor 101 updates the destination lookup memory 110 and network control data memory 120 in the network processor 102 with the changes found in the obtained network topology and path data. This update finally makes it possible for the node 100 to resume its normal packet forwarding operation.

Figure 7:
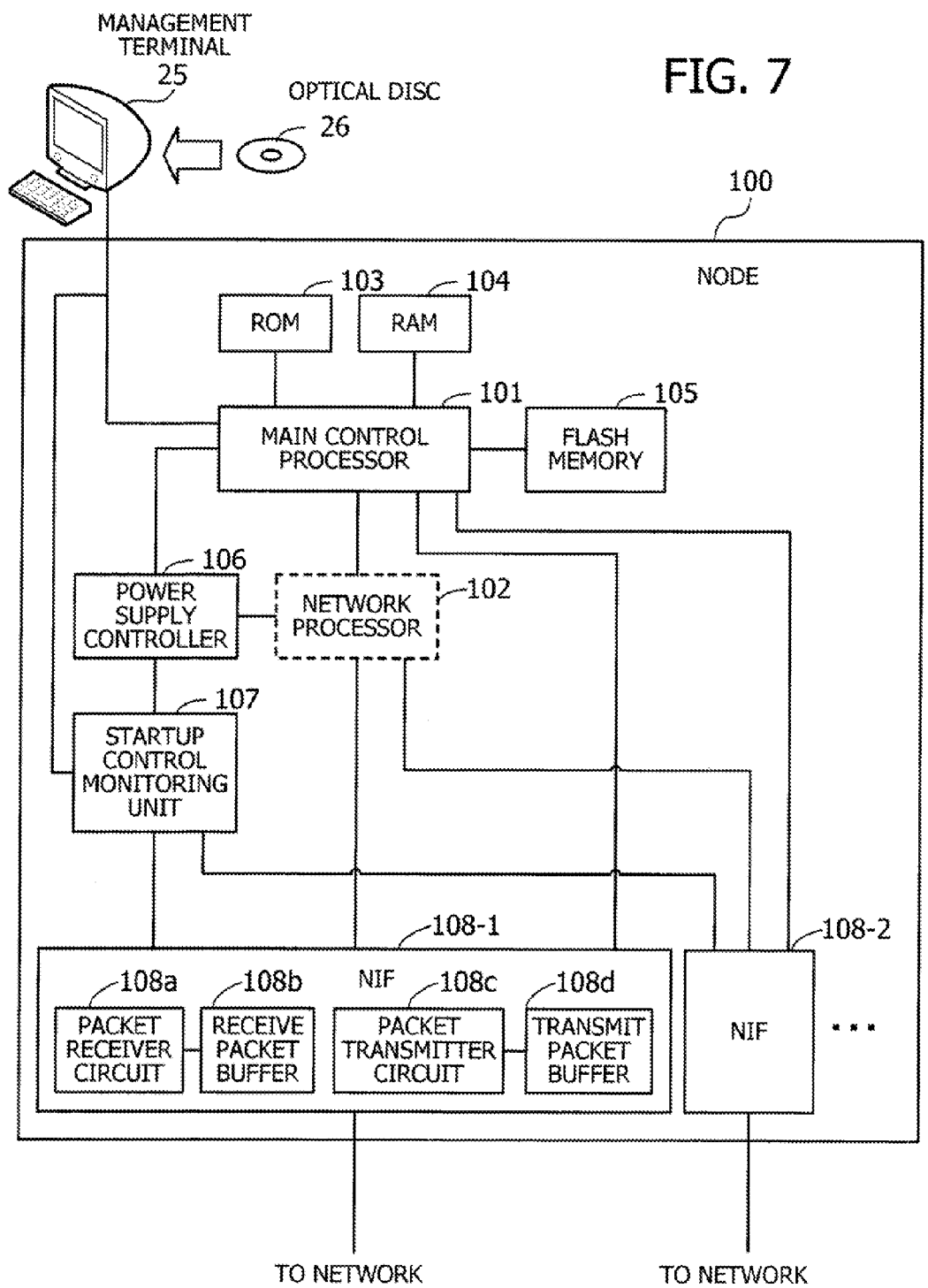
FIG. 7 gives an example of which functions are stopped in light sleep mode.

FIG. 7 gives an example of which functions are stopped in light sleep mode. As in FIG. 6, the broken-line box seen in FIG. 7 represents functions that are stopped in light sleep mode, while the solid-line boxes represent functions that are allowed to operate in light sleep mode. It is noted that the network processor 102 is the only element that is stopped in the example of FIG. 6, whereas the main control processor 101 and other functional elements are in active state.

Before the node 100 goes into light sleep mode, the main control processor 101 obtains current data in the destination lookup memory 110 and network control data memory 120 via the control unit 130 in the network processor 102. The main control processor 101 writes the obtained data in RAM 104. The data in the destination lookup memory 110 and network control data memory 120 has previously been provided from the main control processor 101 to the network processor 102. It may thus be possible for the main control processor 101 to keep a copy of the information in its local RAM 104 when it is sent the network processor 102. This implementation permits the main control processor 101 to eliminate the above-noted write operation to the RAM 104 when the node 100 goes into light sleep mode.

Light sleep mode effectively reduces power consumption although it only disables functions of the network processor 102. For example, ternary content-addressable memory (TCAM) is often used to implement a destination lookup memory 110 in the network processor 102. To provide fast routing lookups, the TCAM consumes more power than other types of memory. Disabling the network processor 102 therefore brings about a good power saving effect.

During light sleep mode, the main control processor 101 is allowed to communicate some control packets (e.g., those produced by routing protocols) with other nodes. The main control processor 101 keeps updating control data in its local RAM 104 to reflect variations in the network state. When starting the network processor 102, the main control processor 101 copies this control data from the RAM 104 back to the destination lookup memory 110 and network control data memory 120 to enable the network processor 102 to start packet routing operation.

As can be seen from the above, the copying of control data is the only thing that the main control processor 101 has to do before starting the network processor 102. This means that the node 100 will quickly start its normal routing operation upon exit from light sleep mode.

It is noted that the operating clock frequency of the main control processor 101 may be lowered to an acceptable level to achieve an additional power saving effect when it is in light sleep mode. This clock frequency reduction is possible because the main control processor 101 in light sleep mode has only to update routing data according to received control packets.

Some additional power saving features may be employed in light sleep mode. For example, the power consumption of NIFs 108-1, 108-2, . . . will be reduced if it is possible to lower the bitrate during sleep mode through negotiation with the peer nodes. For another example, the main control processor 101 may be stopped even in light sleep mode by delegating necessary tasks to the startup control monitoring unit 107. In this case, the startup control monitoring unit 107 handles routing protocols to manage control packets and control data during the sleep. The node 100 may further migrate from light sleep mode to deep sleep mode. In this migration, the main control processor 101 saves routing data and network control data from the RAM 104 to the flash memory 105.

Figure 8:
FIG. 8 illustrates an example data structure of a flow management table.

Details of control data in the network control data memory 120 will now be described below. FIG. 8 illustrates an example data structure of a flow management table. The illustrated flow management table 120a is formed from the following data fields: "Flow ID," "Section," "Path." The flow ID field contains an identifier (flow ID) indicating a specific packet flow from the network 21 to the node 100, and the section field indicates a network section over which the indicated packet flow is transported. This network section is designated by a combination of two node IDs indicating specific ingress and egress nodes. The path field specifies a path or paths of the packet flow indicated by the flow ID field. Specifically, each path is designated by a series of node IDs enumerating every node on that path (i.e., from ingress node to egress node).

FIG. 9 illustrates an example data structure of a flow discrimination table. In the example of FIG. 9, the flow discrimination table 121 is implemented as an associative memory known as content-addressable memory (CAM). The illustrated flow discrimination table 121 is formed from the following data fields: "Physical Input Port Number (#)," "Source MAC Address," "Destination MAC Address," "User Priority (UPRI)" of Tagged VLAN (Virtual LAN) "Source IP Address," "Destination IP Address," "IP Protocol Number," "Source IP Port Number," "Destination IP Port Number," "Diffserv Code Point (DSCP)," "Flow ID," and "Significance Table Address." Those data fields, except for the flow ID field and significance table address field, constitute specific patterns of header information. If the header of a received packet matches with one of those patterns, the corresponding flow ID and significance table address are retrieved from the flow discrimination table 121 as being relevant to the packet.

As can be seen in FIG. 9, each entry of the flow discrimination table 121 is associated with a specific flow ID in the flow ID field. The following explanation uses the term "pertinent packets" to refer to the packets of a specific flow indicated by that flow ID in the flow ID field. For example, the physical input port number field contains a physical port number that indicates a specific physical port through which the node 100 receives the pertinent packets. The source MAC address field contains a source MAC address that is seen in the header of the pertinent packets. The destination MAC address field contains a destination MAC address that is seen in the header of the pertinent packets. The user priority field indicates a user priority (UPRI) in the case where the pertinent packets are carried by tagged VLAN frames. The source and destination IP address fields contain source and destination IP addresses of the pertinent packets, respectively. The IP protocol number field contains an IP protocol number that indicates what protocol is used for the pertinent packets. The source and destination IP port number fields contain source and destination IP port numbers of the pertinent packets, respectively. The DSCP field contains a DSCP value of the pertinent packets.

The above-described physical input port number, source MAC address, destination MAC address, user priority, source IP address, destination IP address, IP protocol number, source IP port number, destination IP port number, and DSCP fields may also be specified, not as specific values, but in the form of expressions for matching values or patterns of values. For example, such expressions may include a wildcard that may be substituted for any specific values.

The flow ID field contains a flow ID that indicates a packet flow identified by the data fields described above. The significance table address field contains the address of a specific record in the significance table 122 which corresponds to the packet flow identified by the flow ID. As will be described later, the significance table 122 provides definitions of significance levels for each flow.

When a packet is received, the header parsing unit 140 compares relevant portions of its header with the above-described data fields of the flow discrimination table 121, i.e., physical input port number, source MAC address, destination MAC address, tagged VLAN user priority, source IP address, destination IP address, IP protocol number, source IP port number, destination IP port number, and DSCP. If the header matches with a record in every relevant field, then the header parsing unit 140 extracts the corresponding flow ID and significance table address from that record. The header parsing unit 140 uses the flow discrimination table 121 in this way to obtain a flow ID and a significance table address that are relevant to received packets. This means that the flow discrimination table 121 determines significance of the flow of packets.

Figure 10:
FIG. 10 illustrates an example data structure of a significance table.

FIG. 10 illustrates an example data structure of a significance table. The illustrated significance table 122 is formed from the following data fields: "Significance," "Operation Mode," "Operation Profile," and "Sleep Level."

The significance field indicates significance of a flow. In the example of FIG. 10, the significance of flows is classified into three levels, i.e., "High," "Medium," and "Low." The operation mode field specifies operation mode for each different significance level. In the example of FIG. 10, the operation mode is set to "quality-first mode" when the significance level is high. The operation mode is set to "moderate mode" when the significance level is medium. The operation mode is set to "power saving mode" when the significance level is low. Quality-first mode is to maintain the highest transmission quality of packets by keeping the node 100 operational with its maximum performance. Moderate mode is to implement a moderate reduction of power consumption while preventing packets from degradation of transmission quality as much as possible. Power saving mode is to seek more reduction of power consumption of the node 100 while tolerating some degradation of packets in their transmission quality.

The operation profile field contains an identifier that indicates a specific threshold-vs-performance list among those in a performance control table 123 described later. The significance table 122 specifies different threshold-vs-performance lists for different significance levels. The sleep level field describes sleep levels corresponding to different significance levels. Specifically, the significance table 122 of FIG. 10 provides the following three levels: "Deep Sleep," "Light Sleep," and "No Sleep." When the significance level is high, the sleep level is set to "No Sleep." When the significance level is "Medium," the sleep level is set to "Light Sleep." When the significance level is "Low," the sleep level is set to "Deep Sleep."

The individual records of the significance table 122 are accessed by using their address. For example, the record for high-significance flows is located at address "add #0." The record for medium-significance flows is located at address "add #1." Similarly, the record for low-significance flows is located at address "add #2."

FIG. 11 illustrates an example data structure of a performance control table. The illustrated performance control table 123 contains one or more combinations of threshold and performance values (referred to as "threshold-performance pairs") for each identifier of threshold-vs-performance lists. The threshold values seen in the performance control table 123 serve as the upper limits of load imposed on the node 100 when the node 100 operates at the corresponding performance levels specified in the same table. The load on the node 100 may be represented by, for example, the ratio of the number of packets that the node 100 currently forwards per unit time to the maximum number of packets that the node 100 is capable of forwarding per unit time when it operates with its full performance. For example, threshold "100" means that the threshold is set to the node's maximum performance of forwarding packets. Threshold "25" means that the threshold is set to 25% of the node's maximum performance of forwarding packets.

The performance values seen in the performance control table 123 indicate with what performance level the node 100 is to operate when its processing load is equal to or lower than the corresponding threshold specified in the same table. Those performance levels are specified in terms of the ratios to the maximum processing performance of the node 100 in forwarding packets. The processing performance of the node 100 may be controlled by, for example, changing its operating clock frequency. For example, the performance may be set to 40% by reducing the operating clock frequency to 40% of the maxim operating clock frequency of the node 100, assuming that performance is proportional to clock frequency.

As seen in the example of FIG. 11, the topmost entry provides a threshold-vs-performance list identified as "Threshold-vs-Performance List #1." This entry includes only one threshold-performance pair, which specifies a threshold "100" and its corresponding performance "100." This entry indicates that the node 100 is to keep its maximum performance when the threshold-vs-performance list #1 is applied.

The next entry of the performance control table 123 provides a threshold-vs-performance list identified as "Threshold-vs-Performance List #2," which includes three threshold-performance pairs. The first pair of threshold "25" and performance "40" indicates that the node 100 is to operate at 40% of its full performance when the processing load is equal to or smaller than 25%. The second pair of threshold "55" and performance "70" indicates that the node 100 is to operate at 70% of its full performance when the processing load is over 25%, but still smaller than or equal to 55%. The third pair of threshold "100" and performance "100" indicates that the node 100 is to operate at its full performance when the processing load exceeds 55%.

The bottommost entry of the performance control table 123 provides a threshold-vs-performance list identified as "Threshold-vs-Performance List #3," which includes six threshold-performance pairs. The first pair of threshold "5" and performance "10" indicates that the node 100 is to operate at 10% of its full performance when the processing load is equal to or smaller than 5%. The second pair of threshold "15" and performance "20" indicates that the node 100 is to operate at 20% of its full performance when the processing load is over 5%, but still smaller than or equal to 15%. The third pair of threshold "35" and performance "40" indicates that the node 100 is to operate at 40% of its full performance when the processing load is over 15%, but still smaller than or equal to 35%. The fourth pair of threshold "55" and performance "60" indicates that the node 100 is to operate at 60% of its full performance when the processing load is over 35%, but still smaller than or equal to 55%. The fifth pair of threshold "75" and performance "80" indicates that the node 100 is to operate at 80% of its full performance when the processing load is over 55%, but still smaller than or equal to 75%. The sixth pair of threshold "100" and performance "100" indicates that the node 100 is to operate at its full performance when the processing load exceeds 75%.

Figure 12:
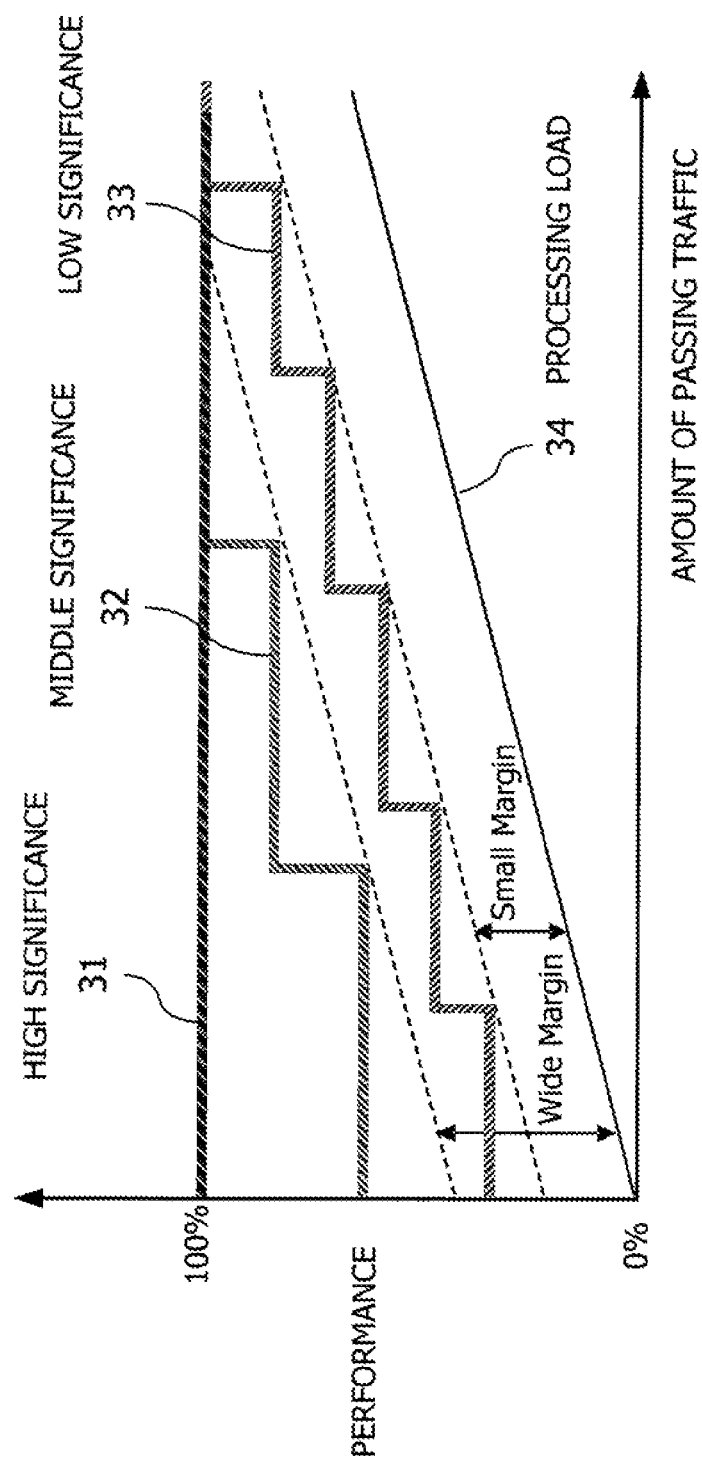
FIG. 12 depicts an example of how the network performance varies with the amount of passing traffic, depending on the significance of flows.

FIG. 12 depicts an example of how the network performance varies with the amount of passing traffic, depending on the significance of flows. The horizontal axis represents the amount of traffic that passes through the node 100, while the vertical axis represents performance that the node 100 is expected to provide. FIG. 12 indicates three different ways of performance variation, which are selected depending on the significance of flows. Specifically, a line 31 indicates the case of high-significance flows, another line 32 indicates the case of medium-significance flows, and yet another line 33 indicates the case of low-significance flows. FIG. 12 also indicates, with a line 34, how the processing load of the node 100 varies with the amount of passing traffic.

More specifically, in the case of high-significance flows, the node 100 keeps its full performance level, regardless of the amount of passing traffic. In the case of medium-significance flows, the node 100 raises its performance level with three steps as the amount of passing traffic increases. In the case of low-significance flows, the node 100 raises its performance level with six steps as the amount of passing traffic increases.

As FIG. 12 illustrates, the node 100 handles low-significance flows with lower performance than in the case of medium-significance flows throughout the range of passing traffic. While the node 100 maintains some amount of performance margin (i.e., the difference between performance level and processing load) for both kinds of flows, the performance margin for medium-significance flows is wider than that for low-significance flows.

As can be seen from the above, the node 100 handles passing packet traffic with a higher significance by selecting a performance profile with a smaller number of control steps and with a wider margin over the peak load that may suddenly occur. With the reduced number of control steps, the node 100 changes its performance levels less frequently, thus alleviating the delays associated with such changes. With the wider margin of performance, the node 100 is free from packet loss even when the traffic increases too fast for the stepwise performance control to follow up.

FIG. 13 illustrates an example data structure of a traffic management table. The illustrated traffic management table 124 is formed from the following data fields: "Flow ID," "Flow Significance," "Input Port," "Egress Edge Node," "Incoming Traffic Volume," and "Transmit Distribution Table."

The flow ID field contains a flow ID of a specific flow, and the flow significance field indicates significance of that flow. The input port field contains an identifier (physical port number) that indicates a specific physical port through which the node 100 receives pertinent packets (i.e., the packets of a specific flow indicated by the flow ID field). The egress edge node field contains an identifier that indicates an edge node from which the pertinent flow (i.e., the flow indicated by the flow ID field) goes out of the network 10. The incoming traffic volume field specifies the amount of incoming traffic of the pertinent flow in terms of, for example, megabytes per unit time. The transmit distribution table field contains an identifier that indicates a specific transmit distribution table, which describes in what ratios the pertinent packets should be distributed to different paths.

FIG. 14 illustrates an example data structure of transmit distribution tables. Transmit distribution tables are designated by their identifiers. For example, the illustrated transmit distribution table 125a is identified by an identifier "Table #1." This transmit distribution table 125a is formed from the following data fields: "Output Port," "Adjacent Node," "Traffic Attractiveness," "Transmit Probability," and "Outgoing Traffic Volume."

As discussed above in FIG. 13, the traffic management table 124 associates each flow with a specific transmit distribution table. This flow is referred to herein as the "associated flow." Referring to FIG. 14, the output port field of a record contains an identifier (physical port number) that indicates a physical port connected to an adjacent node on a path for delivering the associated flow, and the adjacent node field contains a node ID indicating that adjacent node. The traffic attractiveness field indicates attractiveness of the adjacent node (i.e., how strongly the adjacent node attracts traffic from the node 100). The transmit probability field indicates a transmit probability (i.e., with what probability the node 100 transmits packets to the adjacent node) corresponding to the adjacent node's attractiveness. The outgoing traffic volume field indicates how much amount of traffic has been sent out to each path.

In operation, the above-described node 100 controls its own performance and manages its transition to and from sleep mode. Detailed operation will now be described below.

Figure 15:
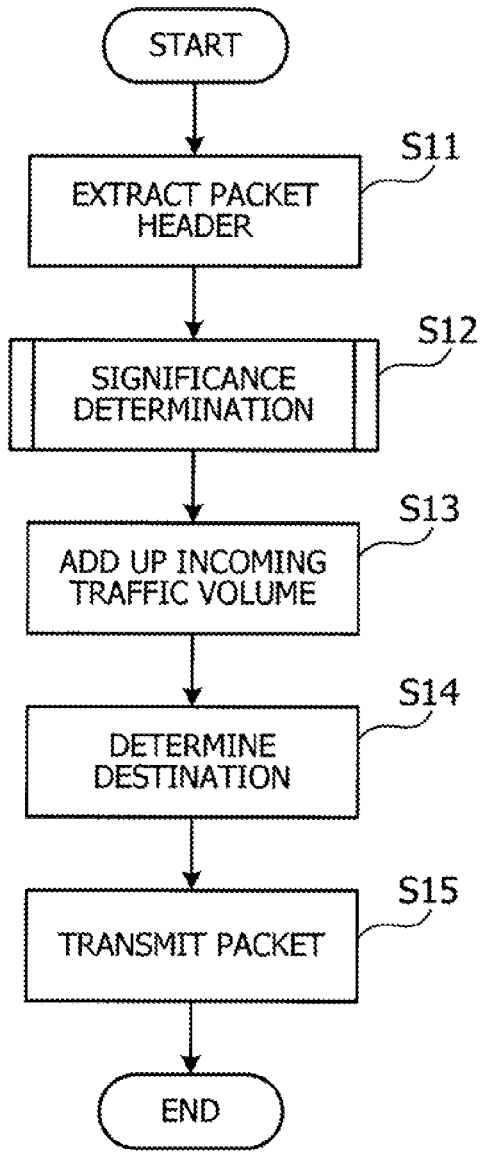
FIG. 15 is a flowchart illustrating the process of handling received packets.

FIG. 15 is a flowchart illustrating the process of handling received packets. Each step of FIG. 15 will be described below in the order of step numbers.

(Step S11) It is assumed that a packet arrives at one NIF 108-1 in the node 100. The header parsing unit 140 in the network processor 102 then obtains the received packet from the receive packet buffer 108b. The header from this packet is subjected to an analysis by the header parsing unit 140.

(Step S12) The header parsing unit 140 executes a process of determining significance of a flow to which the received packet belongs. When called with the received packet as its argument, the significance determination process returns a flow ID and a significance level of the corresponding flow. The details will be described later with reference to FIG. 16.

(Step S13) The traffic measurement unit 170 calculates the integrated amount of incoming traffic of the flow based on the size of the received packet.

(Step S14) The header parsing unit 140 sends the obtained packet header to the destination determination unit 150. In response, the destination determination unit 150 determines to which adjacent node the packet should be forwarded. For example, the destination determination unit 150 interacts with the header parsing unit 140 to obtain a specified transmit probability of each adjacent node. The destination determination unit 150 then selects one of the adjacent nodes as the destination of the packet according to their respective transmit probabilities obtained via the header parsing unit 140.

While the transmit probabilities may be used to consolidate or distribute packet traffic, the node 100 has an option of not doing that. In this case, the destination determination unit 150 determines the destination node on the basis of routing protocols such as OSPF and RIP, by using, for example, a routing table in the destination lookup memory 110. The destination determination unit 150 further obtains MAC address of the determined adjacent node, as well as an identifier (physical port number) indicating the physical port linked to the adjacent node, from the destination lookup memory 110. The obtained information is supplied to the packet transmission unit 160.

(Step S15) The packet transmission unit 160 retrieves the packet from the receive packet buffer 108b and retransmits it to the adjacent node that the destination determination unit 150 has selected. More specifically, the MAC address obtained from the destination determination unit 150 is used as a new destination MAC address of the packet. The packet transmission unit 160 then passes this packet to one of the NIFs that accommodates a physical port indicated by the physical port number obtained from the destination determination unit 150. The receiving NIF puts the packet into its local transmit packet buffer 108d. The packets stored in this transmit packet buffer 108d are transmitted to the adjacent node one by one.

Figure 16:
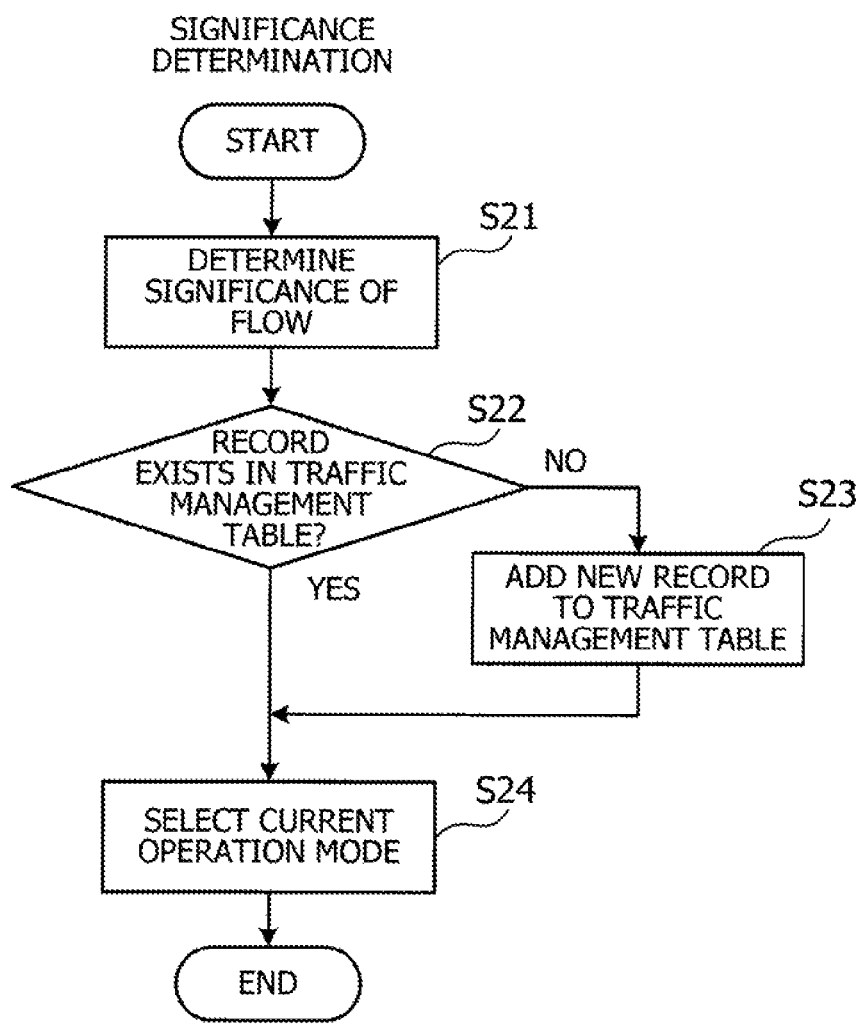
FIG. 16 is a flowchart illustrating the process of determining significance.

The aforementioned significance determination process (step S12) will now be described in detail below. FIG. 16 is a flowchart illustrating the process of determining significance of flows. Each step of FIG. 16 will be described below in the order of step numbers.

(Step S21) The header parsing unit 140 determines significance of a given flow. For example, the header parsing unit 140 first searches the flow discrimination table 121 for a record that matches with the physical input port number and header information of the received packet. More specifically, the header information is compared with the following data fields of each record in the flow discrimination table 121: source MAC address, destination MAC address, VLAN tag, user priority (UPRI), source IP address, destination IP address, IP protocol number, source IP port number, destination IP port number, and DSCP. When a matching record is found, the header parsing unit 140 obtains the flow ID and significance table address from that record. The header parsing unit 140 then consults the significance table 122 to extract a record located in the obtained significance table address. The extracted record indicates a specific significance value. The header parsing unit 140 determines this value as the significance of the received packet flow.

(Step S22) The header parsing unit 140 determines whether the traffic management table 124 already has a record for the flow ID obtained at step S21. When there is an existing record containing the flow ID in question, the header parsing unit 140 proceeds to step S24. If no such record is found, the header parsing unit 140 advances to step S23.

(Step S23) The header parsing unit 140 updates the traffic management table 124 to add a new record for the obtained flow ID. This record begins with the flow ID obtained at step S21 in its flow ID field and includes the following values in subsequent data fields: The flow significance field contains the significance determined at step S21. The input port field contains the input port number obtained at step S21 from a matching record in the flow discrimination table 121. The egress edge node field contains the identifier of an edge node (egress edge node) that delivers packets from the network to another network accommodating their destination device. The header parsing unit 140 may identify the egress edge node by, for example, tracing the path of received packets toward their destination until an edge node is found on that path. This method assumes that the node 100 has previously been informed of IP addresses of edge nodes in the network 10. A delivery path of packets is obtained by using a traceroute command of UNIX® and the like. At the time of creation of a new record, its incoming traffic volume field of the new record is left blank or given a prescribed initial value. The transmit distribution table field contains an identifier of a transmit distribution table that is newly produced, as will be described below, for the newly registered flow in the traffic management table 124.

When adding a record describing a new flow to the traffic management table 124, the header parsing unit 140 also produces a transmit distribution table for the new flow. This new transmit distribution table has an output port field containing physical port numbers indicating which physical port is used to link with each adjacent node on the paths of the new flow, and an adjacent node field containing identifiers of those adjacent nodes. The adjacent nodes inform the node 100 of their respective attractiveness (i.e., how strongly they attract traffic), and the traffic attractiveness field of the new transmit distribution table indicates this attractiveness of each adjacent node. The transmit probability field contains transmit probabilities corresponding to the attractiveness of each adjacent node. The new transmit distribution table, however, has no data values in its outgoing traffic volume field. The outgoing traffic volume field will be populated later with actual measurements of traffic when the flow is observed by the traffic measurement unit 170.

(Step S24) The header parsing unit 140 selects which operation mode to apply to the node 100. This operation mode is referred to herein as the "current operation mode." For example, the header parsing unit 140 selects an operation mode on the basis of the highest flow significance among those recorded in the traffic management table 124. The header parsing unit 140 then stores information representing the determined current operation mode in the network control data memory 120.

Figure 17:
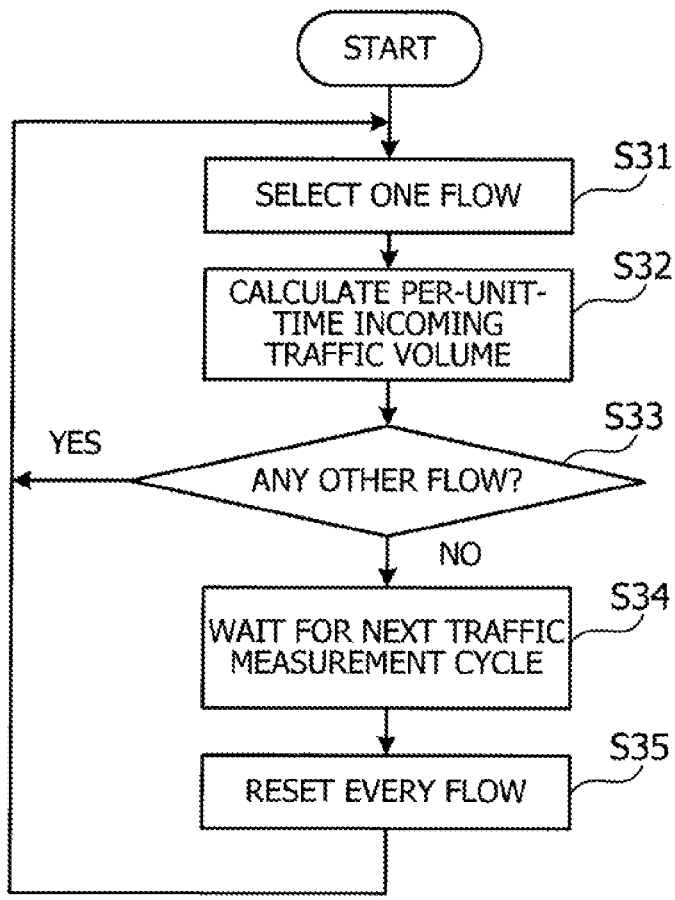
FIG. 17 is a flowchart illustrating the process of measuring traffic volume.

The node 100 measures the amount of traffic in the following way. FIG. 17 is a flowchart illustrating the process of measuring traffic volume. Each step of FIG. 17 will be described below in the order of step numbers.

(Step S31) The traffic measurement unit 170 selects one of the flows registered in the traffic management table 124.

(Step S32) With respect to the selected flow, the traffic measurement unit 170 calculates the amount of traffic (traffic volume) per unit time. For example, the traffic measurement unit 170 first obtains the integrated amount of incoming traffic of the selected flow by adding up the amount of its incoming traffic observed during a given traffic measurement period. The traffic measurement unit 170 then divides the obtained integrated amount of incoming traffic by the length of the traffic measurement period to calculate a traffic volume per unit time (e.g., per second). The traffic measurement unit 170 then stores this per-unit-time traffic volume in the traffic management table 124, as part of a relevant record corresponding to the selected flow.

(Step S33) The traffic measurement unit 170 determines whether the traffic management table 124 includes any other flow. When there is a flow that has not yet been selected, the traffic measurement unit 170 goes back to step S31 to select that flow. When there are no such flows, the traffic measurement unit 170 advances to step S34.

(Step S34) The traffic measurement unit 170 waits until the next traffic measurement cycle comes.

(Step S35) The traffic measurement unit 170 resets every flow to unselected state before going back to step S31.

The above-described steps calculate the amount of incoming traffic of each flow. The next section will describe how the node 100 determines its performance levels.

Figure 18:
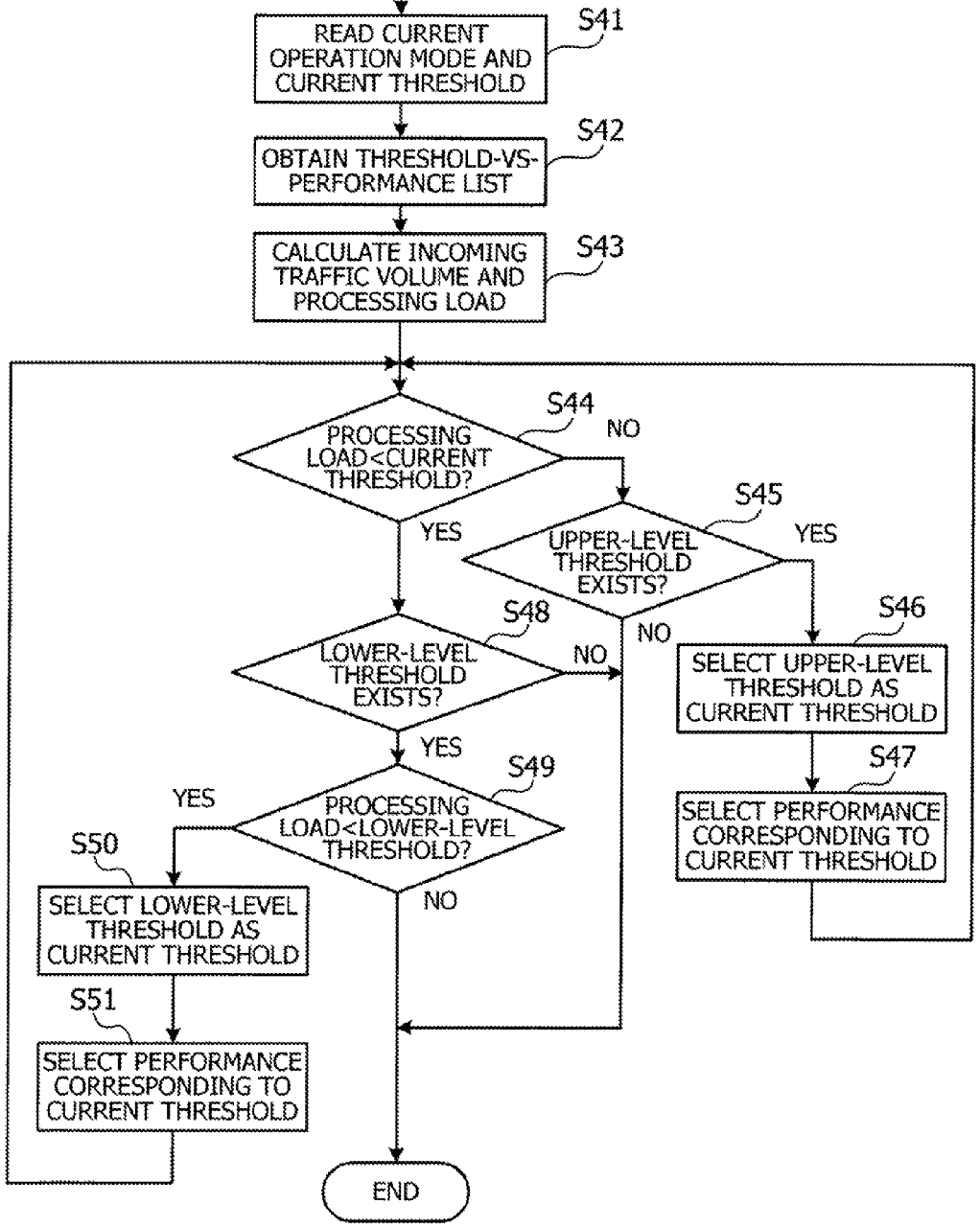
FIG. 18 is a flowchart illustrating the process of determining performance.

FIG. 18 is a flowchart illustrating the process of determining performance. Each step of FIG. 18 will be described below in the order of step numbers. It is noted that the illustrated performance decision process is executed at specified intervals.

(Step S41) The control unit 130 reads the current operation mode 126 and current threshold 127 from the network control data memory 120.

(Step S42) The control unit 130 obtains a threshold-vs-performance list relevant to the current operation mode. For example, the control unit 130 consults the significance table 122 to have an identifier designating a threshold-vs-performance list associated with the current operation mode. The control unit 130 then turns to the performance control table 123 to obtain the threshold-vs-performance list designated by the identifier.

(Step S43) The control unit 130 calculates the amount of incoming traffic that the node 100 is receiving per unit time. For example, the control unit 130 extracts the incoming traffic volume of every flow from a relevant data field of the traffic management table 124. The control unit 130 then adds up the extracted values, thereby calculating the total amount of incoming traffic that the node 100 is receiving. Based on this result, the control unit 130 further calculates a current processing load of the node 100 by, for example, dividing the total amount of incoming traffic by the maximum amount of traffic that the node 100 is capable of handling per unit time.

(Step S44) The control unit 130 determines whether the calculated processing load is smaller than the current threshold. If the processing load is smaller than the current threshold, the control unit 130 proceed to step S48. If the processing load is equal to or greater than the current threshold, the control unit 130 proceeds to step S45.

(Step S45) As the processing load is equal to or greater than the current threshold, the control unit 130 then determines whether there is an upper-level threshold above the current threshold, with reference to the threshold-vs-performance list obtained at step S42. The "upper-level" threshold means a threshold higher than the current one. If there is an upper-level threshold, the control unit 130 advances to step S46. If there are no such thresholds, the control unit 130 terminates the current processing.

(Step S46) The control unit 130 selects an upper-level threshold immediately above the current threshold 127 and substitutes it for the current threshold 127 in the network control data memory 120.

(Step S47) Referring again to the threshold-vs-performance list, the control unit 130 now determines which performance level is associated with the current threshold 127 and selects it as a new performance level of the node 100. For example, the control unit 130 sends the main control processor 101 a specific number representing the selected performance level. In response, the main control processor 101 varies the operating clock and supply voltage by controlling the power supply controller 106 and the like, so that the node 100 will attain the performance level indicated by the control unit 130. The control unit 130 then returns to step S44.

(Step S48) As the processing load is smaller than the current threshold, the control unit 130 then determines whether there is a lower-level threshold below the current threshold, with reference to the threshold-vs-performance list obtained at step S42. The "lower-level" threshold means a threshold smaller than the current one. If there is a lower-level threshold, the control unit 130 advances to step S49. If there are no such thresholds, the control unit 130 terminates the current processing.

(Step S49) The control unit 130 determines whether the processing load is smaller than the lower-level threshold. If the processing load is smaller than the lower-level threshold, the control unit 130 advances to step S50. If not, the control unit 130 terminates the current processing.

(Step S50) The control unit 130 selects the lower-level threshold immediately below the current threshold 127 and substitutes it for the current threshold 127 in the network control data memory 120.

(Step S51) Referring again to the threshold-vs-performance list, the control unit 130 now determines which performance level is associated with the current threshold 127 and selects it as a new performance level of the node 100. The control unit 130 then returns to step S44.

The above-described steps permit the node 100 to operate with a performance level according to the significance of flows therethrough. When there is no passing traffic, the node 100 may stop in sleep mode with an appropriate depth corresponding the significance of previous flows. Suppose, for example, that the node 100 was previously receiving a high-significance flow. In this case, the node 100 continues to operate with its full performance even when the traffic is reduced. This control gives priority to the quality of transmission service over low power consumption, thus enabling the node 100 to forward packets of high-significance flows without delays even when the amount of their traffic is increased.

Figure 19:
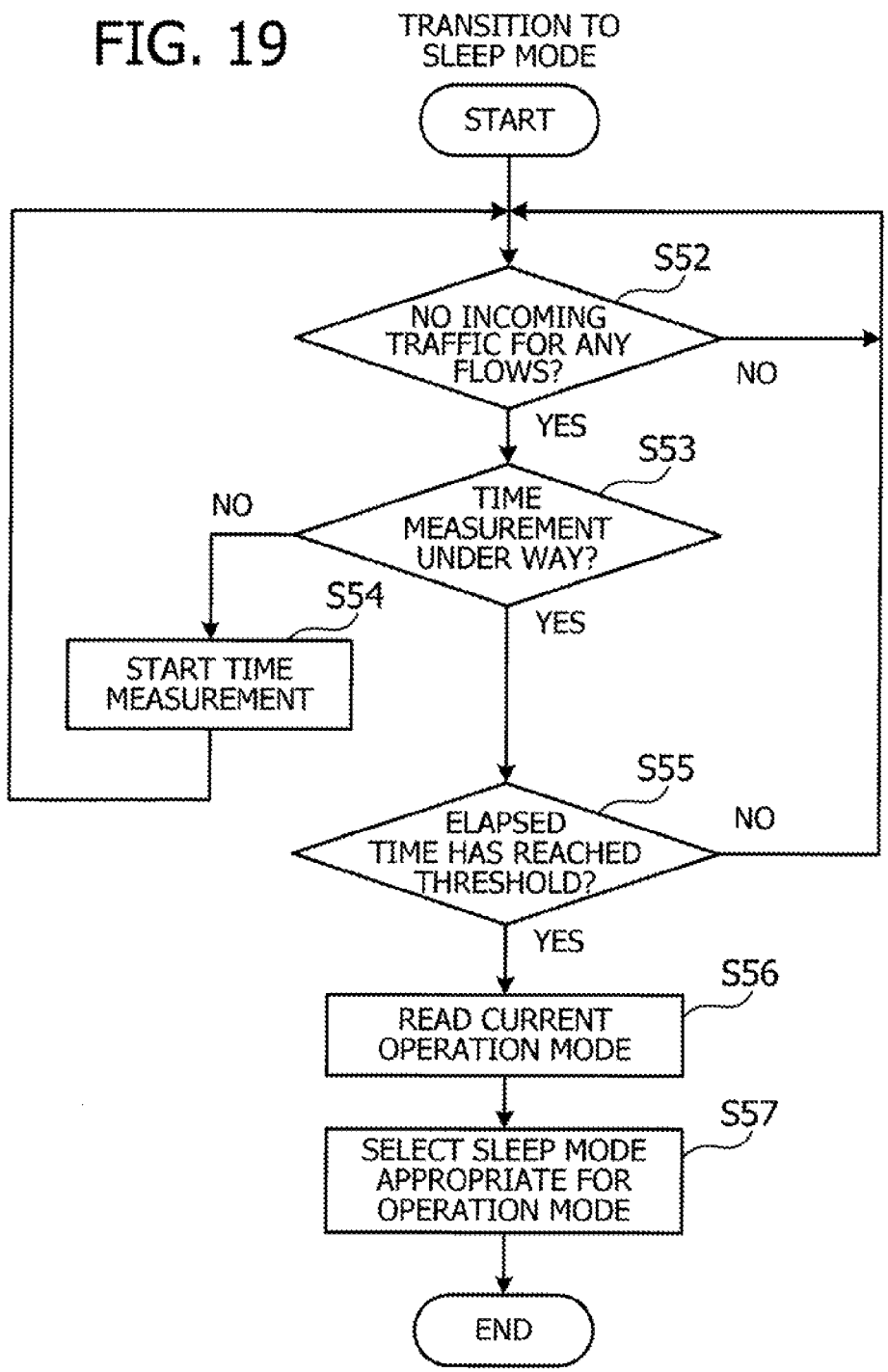
FIG. 19 is a flowchart illustrating transition to sleep mode.

FIG. 19 is a flowchart illustrating transition to sleep mode. Each step of FIG. 19 will be described below in the order of step numbers.

(Step S52) The main control processor 101 determines whether there is no incoming traffic for any flows. For example, the main control processor 101 examines relevant fields of the traffic management table 124 to check the incoming traffic volume of each flow. When the data field of incoming traffic volume is zero-valued for every flow, the main control processor 101 determines that there is no incoming traffic for any flows, and thus proceeds to step S53. When at least one flow indicates presence of incoming traffic, the main control processor 101 repeats the processing of this step S52.

(Step S53) The main control processor 101 checks the presence of an ongoing process of measuring the time elapsed since the detection of zero incoming traffic. If such time measurement is under way, the main control processor 101 advances to step S55. If not, the main control processor 101 advances to step S54.

(Step S54) The main control processor 101 starts measuring the time elapsed since the detection of zero incoming traffic. The main control processor 101 then goes back to step S52.

(Step S55) The main control processor 101 determines whether the elapsed time has reached a predetermined threshold. If the threshold has been reached, the main control processor 101 advances to step S56. If the threshold has not been reached, the main control processor 101 advances to step S52.

The above steps S52 to S55 have been described as a process executed by the main control processor 101. As an alternative configuration, the network processor 102 may execute the same. In that case, the network processor 102 is to inform the main control processor 101 that the time elapsed since zero-traffic detection has reached a threshold, thus permitting the main control processor 101 to execute the following steps S56 and S57.

(Step S56) Since the elapsed time has reached the threshold, the main control processor 101 now reads the current operation mode 126 out of the network control data memory 120.

(Step S57) The main control processor 101 causes the node 100 to move into sleep mode corresponding to the current operation mode. For example, the main control processor 101 consults the significance table 122 to determine which sleep level is pertinent to the current operation mode. If this determination result indicates "no sleep," then the main control processor 101 terminates the processing without causing transition to sleep mode.

In the case where the node 100 was previously receiving traffic of a high-significance flow, the main control processor 101 does not let the packet transmission functions go into sleep mode even though the incoming traffic is lost. This control enables the node 100 to forward packets of the high-significance flow without delays even when the high-significance traffic is resumed.

In the case where the node 100 was previously receiving traffic of flows with a medium significance at most, the node 100 performs power saving operation by lowering its performance level while maintaining a wide performance margin. This control enables the node 100 to forward packets of the medium-significance flow with small delays even when the middle-significance traffic is increased.

Also in the case where the node 100 was previously receiving traffic of flows with a medium significance at the most, the node 100 stops its packet forwarding functions in light sleep mode upon detection of zero incoming traffic. This light sleep mode permits the node 100 to restart its full functions at the moment when the medium-significance traffic flow is resumed, so that the packets of the resumed flow are forwarded with only a small delay.

In the case where the node 100 was solely receiving traffic of low-significance flows, the node 100 performs power saving operation at a reduced performance level with a small performance margin. This control permits the node 100 to reduce its power consumption, thus contributing to power-efficient operation of the network system.

Also in the case where the node 100 was solely receiving traffic of low-significance flows, the node 100 stops its packet forwarding functions in deep sleep mode upon detection of zero incoming traffic. This control permits the node 100 to fully reduce its power consumption, thus contributing to power-efficient operation of the network system.

The above-described processing is executed not only by the node 100, but also by all nodes on the network 10. The network system is expected to operate without increasing power consumption while maintaining the quality of packet transmission. As a result of the above-described processing, the network system achieves these two goals in a well-balanced manner.

When traffic consolidation is implemented in the network 10, the ingress node of traffic specifies which path to use to transport packets of that traffic. The present embodiment may be applied in this type of traffic control. For example, the ingress node determines significance of an incoming flow and informs the relaying nodes and egress node on its path of the determined significance of the flow.

Figure 20:
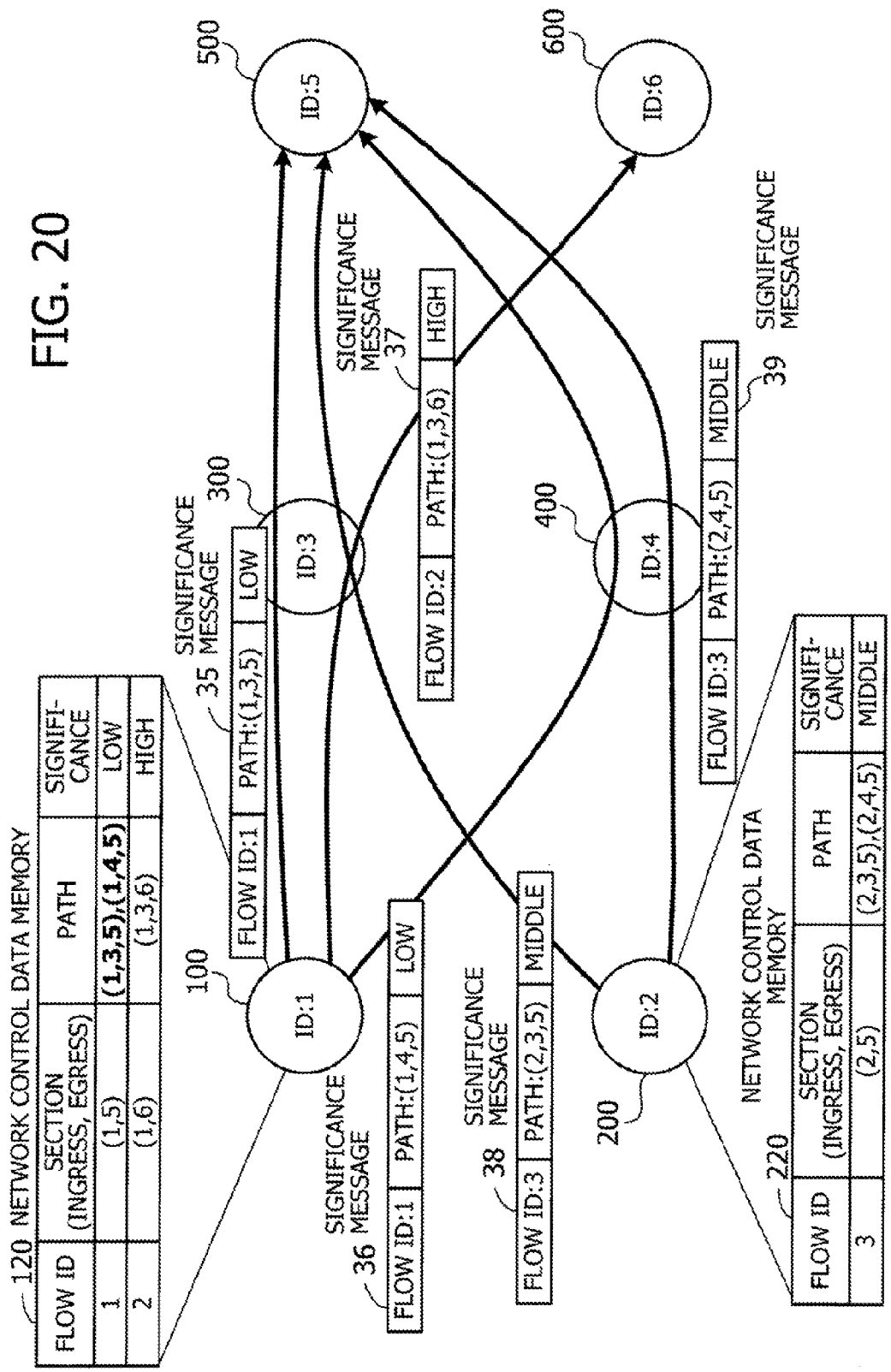
FIG. 20 depicts an example of significance messages.

FIG. 20 depicts an example of significance messages. This example of FIG. 20 assumes that two nodes 100 and 200 serve as ingress nodes of flows. The tables seen in FIG. 20 are part of the data stored in network control data memories 120 and 220 of the nodes 100 and 200.

The node 100 stores information about two flows in its network control data memory 120, which includes their respective flow IDs "1" and "2," sections, paths, and significance levels. When the significance of a received flow is determined in the node 100, its main control processor 101 informs the other nodes on the paths of the determined significance. For example, the main control processor 101 transmits two significance messages 35 and 36 for one flow with flow ID "1" (referred to as flow #1) and one significance message 37 for the other flow with flow ID "2" (referred to as flow #2).

Similarly to the above node 100, another node 200 stores information about one flow in its network control data memory 220, which includes the flow's ID "3," section, paths, and significance level. When the significance of a received flow is determined in the node 200, its main control processor informs the other nodes on the paths of the determined significance. For example, the main control processor transmits two significance messages 38 and 39 for a flow with flow ID "3" (referred to as flow #3).

Those significance messages 35 to 39 each contain specific values representing, for example, flow ID, path data, and significance. Each receiving node forwards the received message to the next node on the path by using path data contained in the message. Those receiving nodes also recognize the significance of each flow that they are supposed to transport, based on the flow ID and significance levels contained in the received significance messages. Each receiving node records the significance of flows in its own traffic management table. That is, the nodes other than ingress nodes are free from the burden of determining significance of incoming flows using a flow discrimination table.

Figure 21:
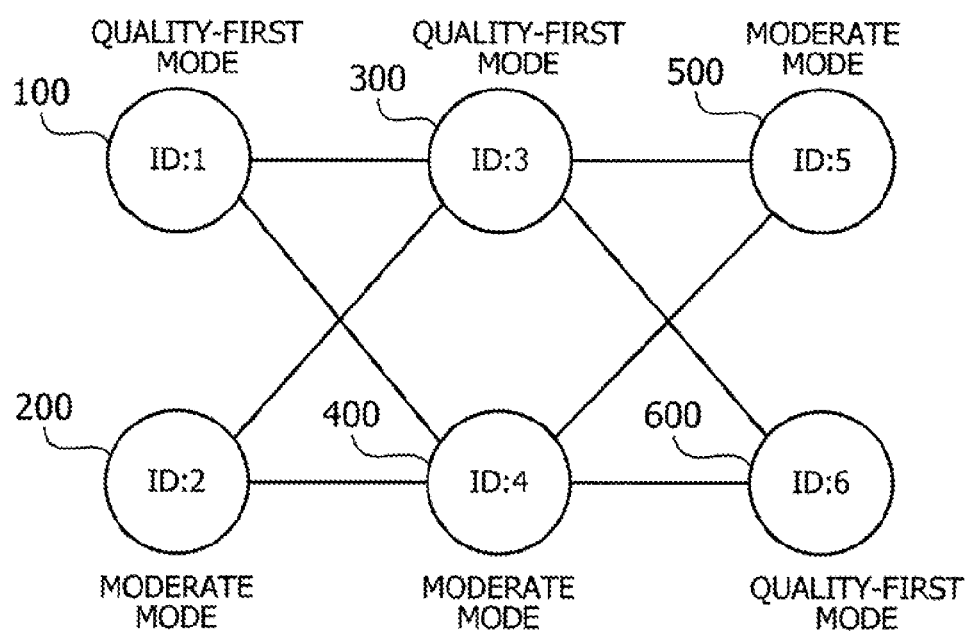
FIG. 21 depicts an example of operation modes of nodes which are determined from the significance of flows.

FIG. 21 depicts an example of operation modes of nodes which are determined from the significance of flows. As a result of the foregoing significance messages of FIG. 20, the nodes 100, 300, and 600 now operate in quality-first mode since they constitute a path of a high-significance flow. The nodes 200, 400, and 500, on the other hand, operate in moderate mode since they constitute paths of medium- and low-significance flows.

Figure 22:
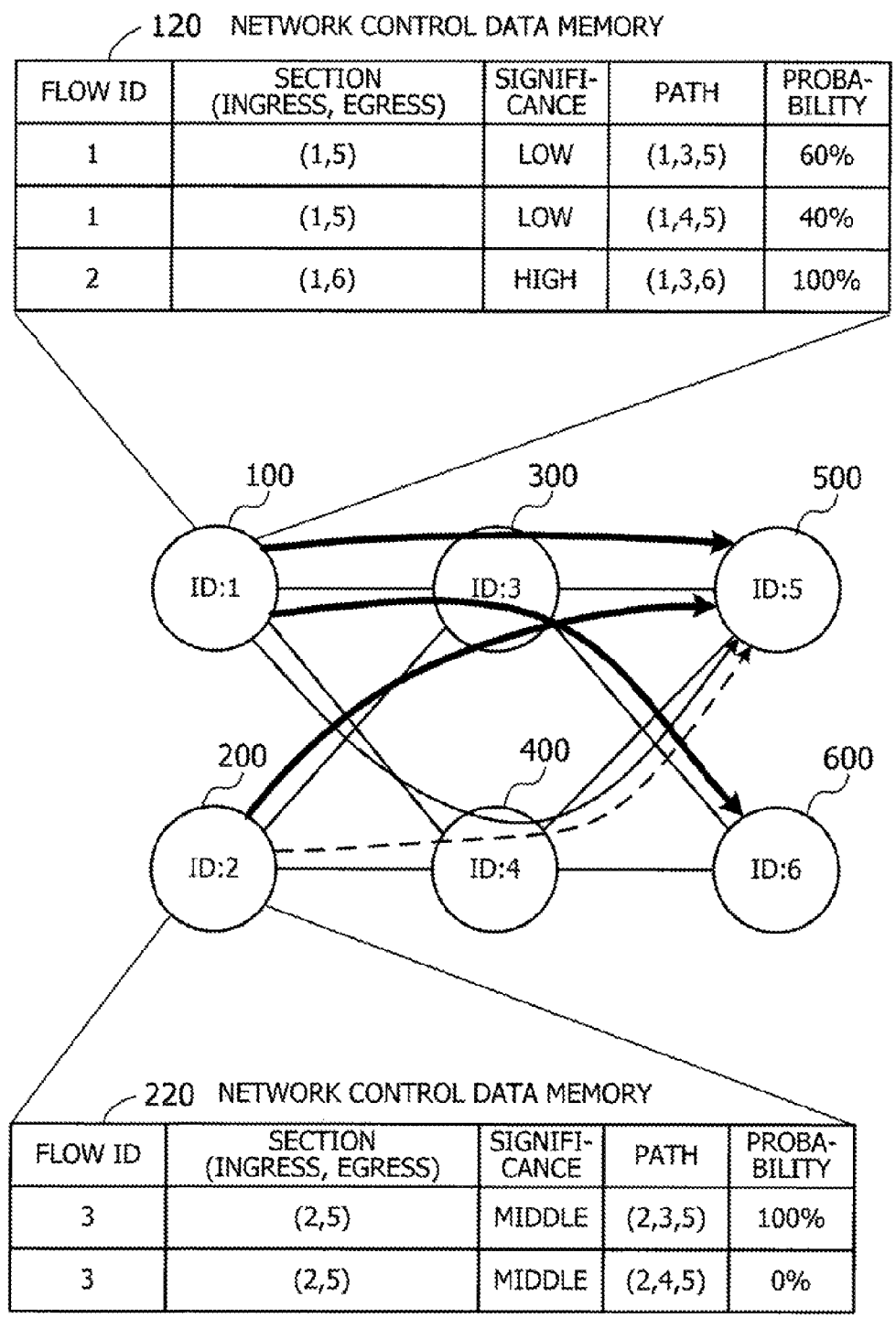
FIG. 22 illustrates an example of how the transmit probability is controlled according to attractiveness.

Suppose now that the network system performs traffic consolidation based on attractiveness of nodes operating in the operation modes described above. FIG. 22 illustrates an example of how the transmit probability is controlled according to attractiveness. The tables seen in FIG. 22 are part of the data stored in network control data memories 120 and 220 of the two nodes 100 and 200.

Referring to the example of FIG. 22, the ingress node 100 transmits two flows. One flow is delivered to the egress node 500, divided into two paths. One path delivers 60% of the traffic via a relaying node 300, while the other path delivers 40% of the traffic via another relaying node 400. The other flow is delivered to the node 600, all packets of which are conveyed by the path running through the node 300. Another ingress node 200, on the other hand, transmits one flow to the egress node 500. This flow has two paths, but the one path passing through the node 300 occupies 100% of the traffic, whereas the other path passing through the node 400 does not carry the flow.

Figure 23:
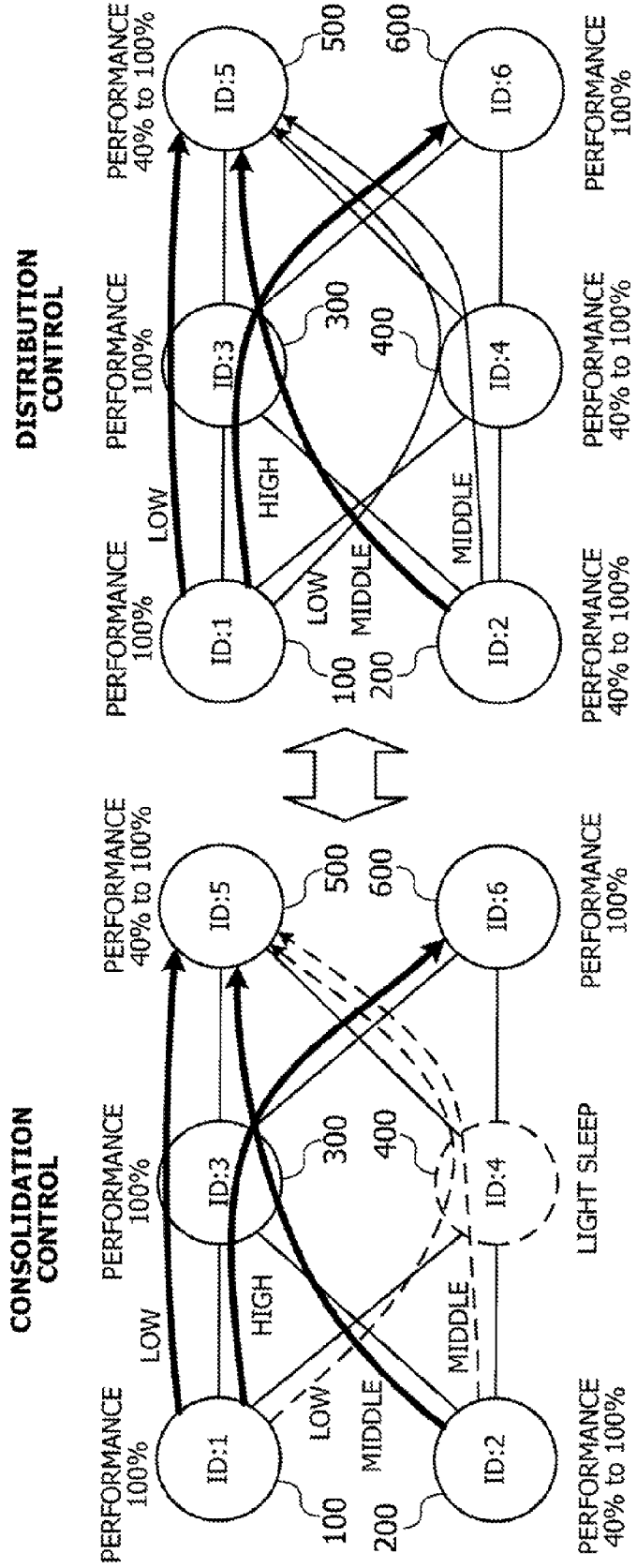
FIG. 23 compares consolidated network traffic with distributed network traffic.

FIG. 23 compares consolidated network traffic with distributed network traffic. Having started from the state seen in FIG. 22, the network system now consolidates traffic as illustrated in the left half of FIG. 23, where the broken lines indicate the paths conveying no packets. Specifically, the flow from node 100 to node 500 is directed entirely to one relaying node 300 (i.e., transmit probability of 100%), whereas no traffic is directed to the path passing through another relaying node 400 (i.e., zero transmit probabilities). With the absence of incoming traffic, this relaying node 400 is allowed to go into sleep mode. More specifically, the relaying node 400 goes into light sleep mode because its previous flows were of a medium significance at the most.

The other nodes operate with their own performance levels, depending on how significant their incoming traffic is. The nodes 100, 300, and 600, for example, operate with their full performance because they are receiving high-significance traffic. On the other hand, the nodes 200 and 500 operate with 40% to 100% of their respective performance depending on the amount of incoming traffic of low- and medium-significance flows that they are receiving. Suppose, for example, that the traffic flow from node 200 to node 500 amounts to 400 Mbps when traffic consolidation is under way. Assuming that this traffic volume is equivalent to 40% of its full performance, the node 200 operates with 70% performance as defined in its performance control table, which is similar to the one illustrated in FIG. 11.

The network may encounter an increase of traffic in, for example, the flow from node 100 to node 500. This increased traffic causes the node 300 to detect a risk of congestion in its transmission path to the node 500. An alarm message is then sent from the node 300 to other nodes 100 and 200 to initiate an operation for distributing traffic. As result of traffic distribution control, the flow to the egress node 500 is partly diverted to another path that runs from the ingress node 100 to the relaying node 400. Similarly the flow from node 200 to node 500 is partly diverted to the relaying node 400. The diverted traffic wakes the node 400 up. The node 400 then operates in the range of 40% to 100% of its full performance, depending on the amount of incoming traffic of low- and medium-significance flows that the node 400 receives.

As described above, the traffic distribution control has produced two additional paths of packet traffic directed to the node 500. It is assumed, for example, that the amount of traffic diverted from node 100 to node 400 is 400 Mbps, and that the amount of traffic diverted from node 200 to node 400 is 200 Mbps. This means that the node 400 receives incoming traffic of 600 Mbps in total. It is assumed here that the node 400 has to spend 60% of its processing performance to handle the 600-Mbps incoming traffic. The node 400 thus changes its state to operate with its full performance as defined in its performance control table, which is similar to the one illustrated in FIG. 11.

As can be seen from the above description, the second embodiment is designed to determine the operation mode of each node according to significance of packet flows and control performance levels of the nodes, as well as transition to sleep mode, depending on their respective operation modes. These features of the second embodiment enable reduction of power consumption of the network as a whole, while maintaining the quality of transmission service for high-significance flows.

Further, the second embodiment allows the performance levels of nodes to be varied according to their workload. It is thus possible to reduce the power consumption of nodes by lowing their performance when the amount of incoming traffic is small. When some flows demand stringent quality management, the second embodiment provides a wider performance margin over the load. This feature prevents such flows from quality degradation when the amount of their traffic is increased later. The power consumption of the network is controlled in a fine-grained manner, while ensuring the reliability of transmission for quality-demanding flows.

(c) Third Embodiment

A third embodiment will now be described below. The third embodiment is designed to determine operation profiles and sleep levels taking into account the significance of traffic flows received during a specific period in the past.

According to the third embodiment, a node selects quality-first mode as its current operation mode, even if the node has no incoming traffic at the moment, in the case where there was incoming traffic of a high-significance flow during a specific period in the past. This control intends to make the node ready for resumed transmission of high-significance traffic, so that quality degradation will be avoided in that event. The effect of such a previous high-significance traffic flow would, however, cease with time. That is, a high-significance flow is regarded as extinct when a specified length of time has passed since the last occurrence of that flow, and when this is the case, the operation mode of the node is changed from quality-first mode to moderate mode or power saving mode to reduce the node's power consumption.

Figure 24:
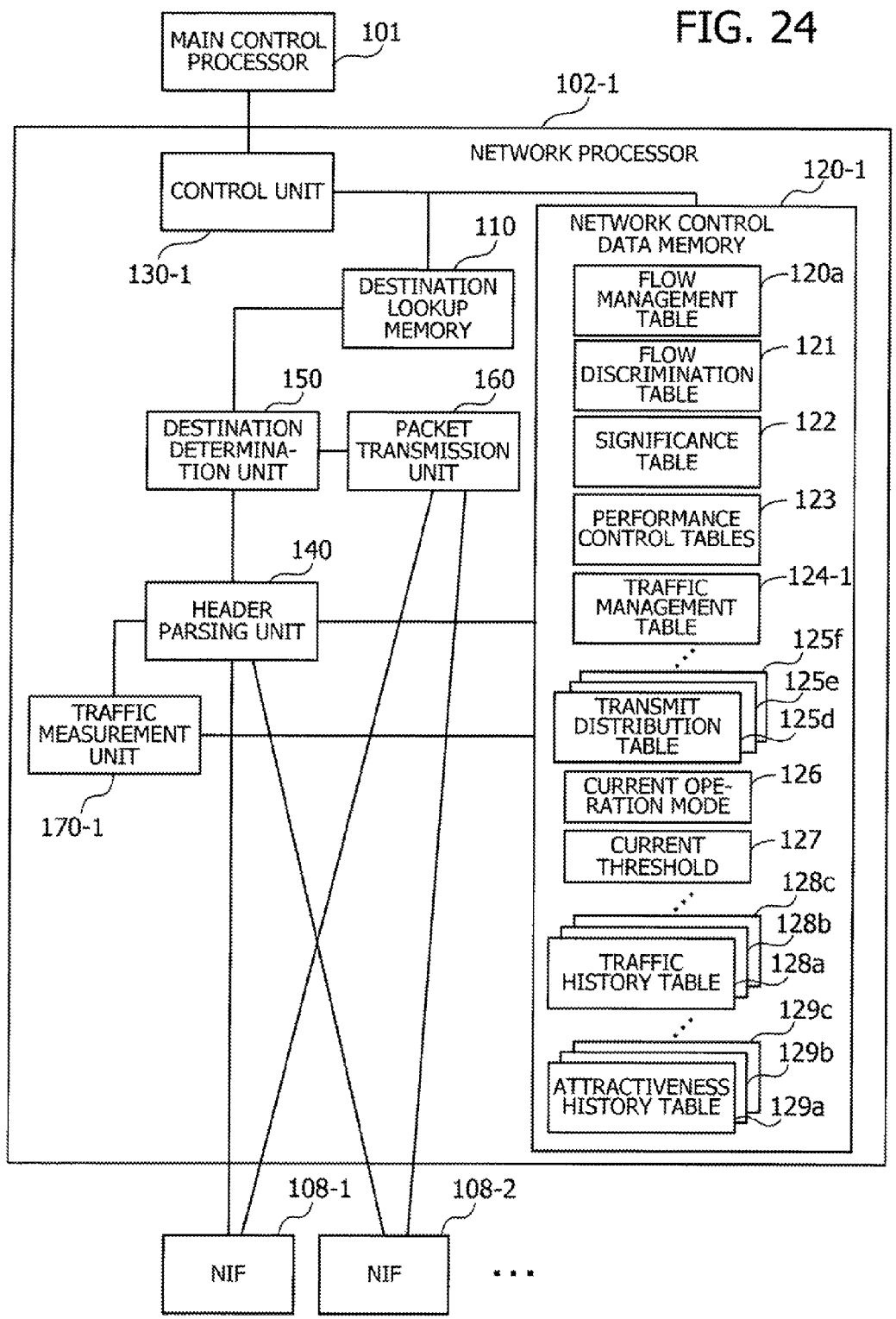
FIG. 24 is a block diagram illustrating an example of internal functions of a network processor according to a third embodiment.

To implement the above-described control, each node according to the third embodiment includes the function of storing traffic log records. FIG. 24 is a block diagram illustrating an example of internal functions of a network processor according to the third embodiment. The network processor illustrated in FIG. 24 shares some similar elements with the network processor 102 discussed in FIG. 5. Therefore, the following section will focus on its distinctive points, while affixing like reference numerals to like elements.

The third embodiment includes a network control data memory 120-1 configured to store a plurality of traffic history tables 128a, 128b, 128c, and so on, along with a plurality of attractiveness history tables 129a, 129b, 129c, and so on. The third embodiment also has a traffic management table 124-1 that is modified to store the identifiers of traffic history tables in place of the incoming traffic volume used in the second embodiment. The transmit distribution tables 125d, 125e, 125f, . . . are also modified to store the identifiers of attractiveness history tables 129a, 129b, 129c, . . . in place of the traffic attractivity and transmit probability used in the second embodiment.

According to the third embodiment, the traffic measurement unit 170-1 is configured to manage the history of the amount of traffic for each individual flow. The control unit 130-1 is also configured to manage the history of attractiveness for each individual output port. Specifically, the control unit 130-1 of the third embodiment manages the attractiveness history tables 129a, 129b, 129c, . . . so as to record attractiveness distribution probabilities of adjacent nodes, not only the latest values, but also several sets of past values.

FIG. 25 illustrates an example data structure of a traffic management table according to the third embodiment. The illustrated traffic management table 124-1 is formed from the following data fields: "Flow ID," "Flow Significance," "Input Port," "Egress Edge Node," "Traffic History Table," and "Transmit Distribution Table." The flow ID, flow significance, input port, egress edge node, and transmit distribution table fields are used to store the same kinds of information as their respective counterparts in the foregoing traffic management table 124 discussed in FIG. 13 as part of the second embodiment. It is noted that the traffic history table field of each record contains an identifier that indicates a traffic history table associated with a specific flow identified by the flow ID field of the same record.

Figure 26:
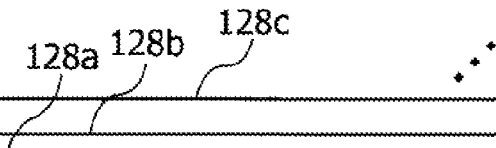
FIG. 26 illustrates an example data structure of a traffic history table.

FIG. 26 illustrates an example data structure of a traffic history table. The illustrated traffic history table 128a is designated by its identifier "sheet #11." The leftmost column of this traffic history table 128a gives a plurality of labels, "Incoming Traffic" and "Outgoing Traffic," to describe their corresponding rows. The topmost row gives a plurality of labels that describe each data field as follows: "No-Traffic Count," "Current Traffic," "Previous Traffic," and "Second Previous Traffic."

The node performs traffic volume measurement at specific intervals. The no-traffic count field indicates how many times in a row the corresponding traffic (incoming traffic or outgoing traffic) has been determined as being absent. The current traffic field indicates the latest measurement value of traffic volume. The previous traffic field indicates a measurement value of traffic volume that was obtained in one measurement cycle ago. The second previous traffic field indicates a measurement value of traffic volume that was obtained two measurement cycles ago. While the traffic history tables illustrated in FIG. 26 hold two sets of past measurement values, it is not intended to limit the third embodiment to this specific example. The number of such past records may be specified as necessary by the administrator.

FIG. 27 illustrates an example data structure of a transmit distribution table according to the third embodiment. The illustrated transmit distribution table 125d is designated by an identifier "Table #21." This transmit distribution table 125d is formed from the following data fields: "Output Port," "Adjacent Node," and "Attractiveness History Table." The output port field and adjacent node field are used to store the same kinds of information as their respective counterparts in the foregoing transmit distribution table 125a discussed in FIG. 14 as part of the second embodiment. The attractiveness history table field contains an identifier that specifies an attractiveness history table associated with the transmit distribution table 125d itself.

FIG. 28 illustrates an example data structure of an attraction history table. The illustrated attractiveness history table 129a is designated by an identifier "sheet #31." The leftmost column of this attractiveness history table 129a gives a plurality of labels representing attractiveness and transmit probability of each output port designated by specific port numbers. The topmost row indicates two data fields labeled "Current Calculation Value" and "Previous Calculation Value."

The current calculation value field contains the latest attractiveness and transmit probability that are calculated for each output port. The previous calculation value field contains a past attractiveness and transmit probability that were calculated in the immediately preceding cycle. While the attraction management tables seen in FIG. 28 hold only one set of past calculation values, it is not intended to limit the third embodiment to this specific example. The number of such past values may be specified as necessary by the administrator.

Figure 29:
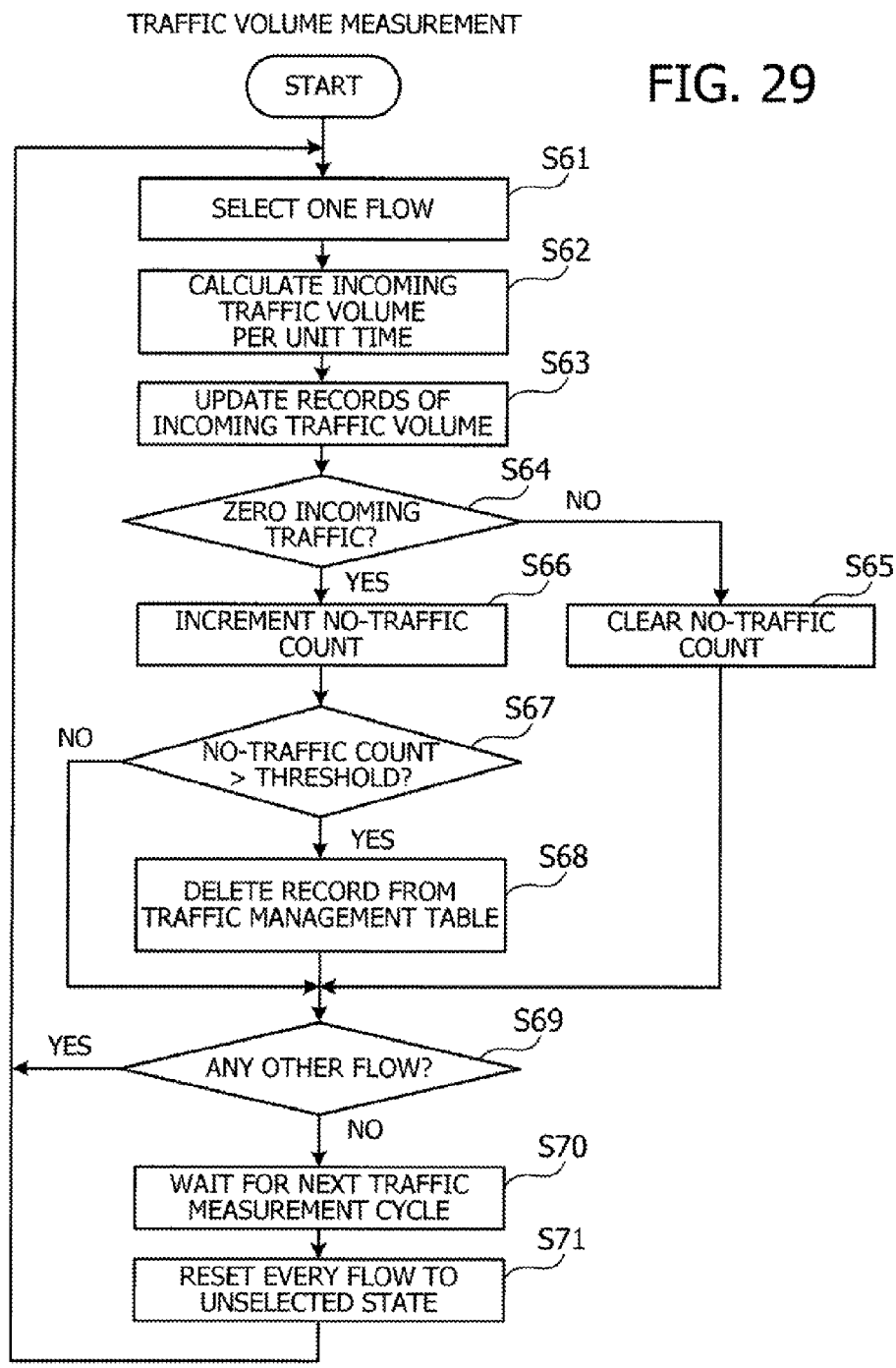
FIG. 29 is a flowchart illustrating the process of measuring traffic volume according to the third embodiment.

Traffic volume measurement in the third embodiment will now be described in detail below. FIG. 29 is a flowchart illustrating the process of measuring traffic volume according to the third embodiment. Each step of FIG. 29 will be described below in the order of step numbers.

(Step S61) The traffic measurement unit 170-1 selects one of the flows registered in the traffic management table 124-1.

(Step S62) With respect to the selected flow, the traffic measurement unit 170-1 calculates the amount of traffic per unit time. For example, the traffic measurement unit 170-1 first obtains an integrated amount of incoming traffic of the selected flow by adding up the amount of its incoming traffic observed during a given traffic measurement period. The traffic measurement unit 170-1 then divides the obtained amount by the length of the traffic measurement period to calculate an incoming traffic volume per unit time (e.g., per second).

(Step S63) The traffic measurement unit 170-1 updates a relevant traffic history table with the latest incoming traffic volume. For example, the traffic measurement unit 170-1 deletes the existing value in the second previous traffic field of a traffic history table associated with the selected flow. The traffic measurement unit 170-1 then moves the value in the previous traffic field to the second previous traffic field. The traffic measurement unit 170-1 further moves the value in the current traffic field to the previous traffic field. Finally the traffic measurement unit 170-1 populates the emptied current traffic field with the incoming traffic volume calculated at step S62. Old records of traffic volume are removed from traffic history tables in this way, as they age over a specified period.

(Step S64) The traffic measurement unit 170-1 checks whether the latest measurement value of incoming traffic volume is zero. If the latest measurement value is zero, the traffic measurement unit 170-1 advances to step S66. If not, the traffic measurement unit 170-1 advances to step S65.

(Step S65) The traffic history table for the selected flow has a data field of no-traffic count. The traffic measurement unit 170-1 clears this no-traffic count to zero since the latest measurement value of incoming traffic volume indicates the presence of traffic, The traffic measurement unit 170-1 then advances to step S69.

(Step S66) The traffic measurement unit 170-1 increments the no-traffic count by one since the latest measurement value of incoming traffic volume indicates the absence of traffic.

(Step S67) The traffic measurement unit 170-1 determines whether the no-traffic count has exceeded a predetermined threshold. If the no-traffic count is above the threshold, the traffic measurement unit 170-1 advances to step S68. If not, the traffic measurement unit 170-1 skips to step S69.

(Step S68) The traffic measurement unit 170-1 deletes the record of the selected flow from the traffic management table 124-1. The traffic measurement unit 170-1 may also delete the traffic history table and transmit distribution table corresponding to the selected flow.

(Step S69) The traffic measurement unit 170-1 determines whether the traffic management table 124-1 includes any other flow. When there is a flow that has not yet been selected, the traffic measurement unit 170-1 goes back to step S61 to select that flow. When there are no such flows, the traffic measurement unit 170-1 advances to step S70.

(Step S70) The traffic measurement unit 170-1 waits until the next traffic measurement cycle comes.

(Step S71) The traffic measurement unit 170-1 resets every flow to unselected state before going back to step S61.

While the process illustrated in FIG. 29 measures the amount of incoming traffic and updates its related records in a traffic history table, the third embodiment may also measure the amount of outgoing traffic and updates its related records in a traffic history table in a similar way. In that case, the amount of outgoing traffic is calculated for each individual physical port that sends out the traffic.

Just as done by the processing of FIG. 16 in the second embodiment, the third embodiment also selects a current operation mode according to the maximum significance of flows recorded in the traffic management table 124-1. Operation profile and sleep level of a node are then determined on the basis of the current operation mode that is selected.

Performance control of the third embodiment is similar to the one explained in FIG. 18 for the second embodiment. In the third embodiment, however, the performance level of a node 100 may be determined in consideration of records of incoming traffic received during a specified period in the past. For example, the control unit 130-1 reads out the values of incoming traffic volume from traffic history tables 128a, 128b, 128c, . . . for all flows when it executes step S43 of FIG. 18 (calculation of incoming traffic volumes). More particularly, the control unit 130-1 extracts the maximum value of incoming traffic from among the latest record and past records of each flow. Suppose, for example, that both the current traffic field and previous traffic field indicate zeros, while the second previous traffic field indicates 10. The control unit 130-1 extracts in this case the value of 10 as the incoming traffic volume of that flow. The control unit 130-1 then adds up all those extracted values of incoming traffic volume, thereby obtaining the amount of incoming traffic that the node 100 have been receiving, taking into consideration the past traffic.

As can be seen from the above, the third embodiment selects performance levels of a node in consideration of the amount of traffic experienced in the past. This feature enables the node to transport packets without delays even in the case where the traffic revives after a temporary absence.

When there is a certain amount of incoming traffic and the node is thus in an active state, the node seeks the maximum significance of flows including those that have ceased flowing. The node then determines its current operation mode based on that maximum significance, and further selects an operation profile based on that current operation mode. When none of those flows has active traffic, the node determines its sleep level according to the maximum significance of flows seen in the traffic management table 124-1.

The traffic management table 124-1 accepts records of new flows. Those records may be added automatically by the node itself upon arrival of packets of a new flow (dynamic setup) or manually by a human operator (static setup). Inactive flows that indicate zero traffic for a specified time are regarded as extinct, rather than as being consolidated into other paths, and their records are removed from the traffic management table 124-1. This removal of records also invalidates their obsolete significance values, thus permitting the node to determine an appropriate operation mode.

The process of FIG. 29 is executed by the network processor 102-1, which may go into light sleep mode. Then, instead of the network processor 102-1, the main control processor 101 takes care of no-traffic counts during light sleep mode. For example, the main control processor 101 increments the no-traffic count of a flow each time a new traffic measurement period comes without indication of incoming traffic of that flow. When the no-traffic count of a flow exceeds a threshold, the main control processor 101 deletes the record of that flow in the traffic management table 124-1. The main control processor 101 repeats this until the traffic management table 124-1 only contains records of flows with a low significance. The main control processor 101 then brings the node into deep sleep mode, thereby saving more power than in light sleep mode.

(d) Fourth Embodiment

A fourth embodiment will now be described below.

The fourth embodiment is designed to cause the ingress node of a flow to determine whether the flow has become extinct or been consolidated into some other path. The ingress node sends the determination result to other nodes on the original path of the flow, so that each node will be able to know the exact reason for such flows' disappearance.

The foregoing second and third embodiments implement the feature of traffic consolidation using attractiveness of traffic, such that ingress nodes will direct their received traffic flows to a particular path. For this reason, each node calculates the attractiveness of traffic of received flows depending on the amount of passing traffic and provides the resulting attractiveness information to its adjacent nodes. With the attractiveness information from adjacent nodes, the receiving node distributes traffic of the pertinent flows in such a way that an adjacent node with higher attractiveness will receive a larger portion of the traffic. This operation, when repeated, causes high-traffic paths to increase their attractiveness and finally consolidates the traffic into a few paths while directing no traffic to the other paths. The resulting no-traffic nodes are thus brought into sleep mode to reduce their power consumption. As a result of consolidated paths, on the other hand, some node-to-node transmission paths may encounter an increased amount of traffic exceeding a specified threshold. In that case, a control packet carrying alarm information is sent to relevant ingress nodes, which causes the ingress nodes to distribute traffic to a plurality of paths in order to prevent the network from congestion.

In the second and third embodiments, it is each individual node that detects the absence of incoming traffic. The nodes are, however, unable to exactly know why they are receiving no incoming traffic. That is, the absence of incoming traffic may have been caused as a result of attractiveness-based path consolidation (i.e., traffic flowing through some other nodes and paths) or may really mean that the once-existent flow has died out (i.e., no traffic into ingress nodes). If a node in power saving mode misunderstands the reason, the node may not be able to restart its operation in a timely manner when a high-significance flow comes back from its consolidated path and begins flowing over distributed paths to avoid congestion. Such delays in the restarting nodes make it difficult to maintain the required quality of high-significance flows.

In view of the above, the fourth embodiment configures ingress nodes to send control packets at regular intervals in order to indicate presence of flows. Those control packets from an ingress node are directed to some of its adjacent nodes that receive traffic of an existing flow at zero distribution probabilities. The interval of control packets may be shorter than the time it takes for a no-traffic count in the traffic management table to reach a threshold after zero incoming traffic is observed.

Upon receipt of a control packet indicating zero-traffic of a specific flow, the receiving adjacent nodes clear a relevant no-traffic count in their respective traffic management tables. As long as such control packets are received, the flow is allowed to keep its record in the traffic management table in spite of the continuing state of zero incoming traffic. As long as that record keeps staying the traffic management table, the nodes take into consideration the significance of the flow in determining their operation mode.

The above features of the fourth embodiment enable the nodes to correctly distinguish the case where the flow has stopped entering its ingress node from the case where a node sees no traffic because it has been redirected to other path as a result of path consolidation. Accordingly the nodes determine their operation modes in a proper way.

The structure of the nodes and stored data in the fourth embodiment is similar to those in the third embodiment discussed in FIGS. 24 to 28. The following section describes the fourth embodiment by using the reference numerals of elements seen in FIGS. 24 to 28.

Figure 30:
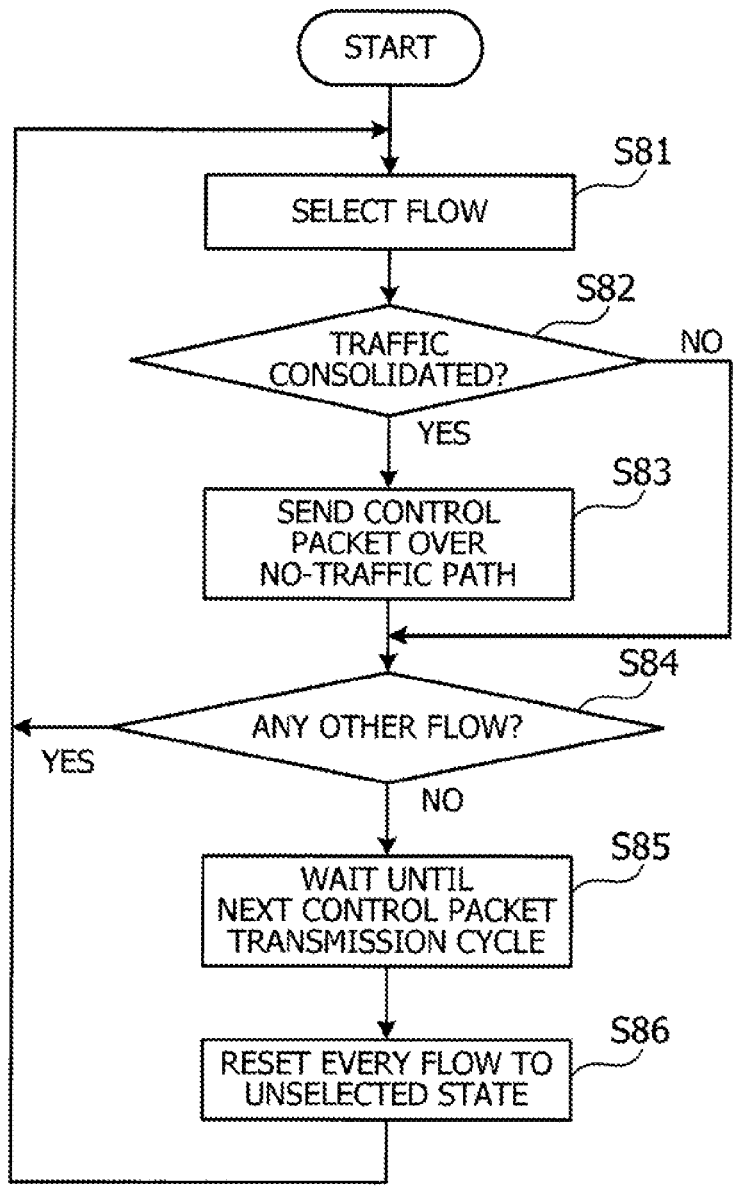
FIG. 30 is a flowchart illustrating the process of transmitting control packets according to a fourth embodiment.

FIG. 30 is a flowchart illustrating the process of transmitting control packets according to the fourth embodiment. Each step of FIG. 30 will be described below in the order of step numbers.

(Step S81) The main control processor 101 selects one of the flows registered in the traffic management table 124-1.

(Step S82) With reference to an attractiveness management table associated with the selected flow, the main control processor 101 determines whether the network traffic has been consolidated. For example, the main control processor 101 determines that the traffic of a flow has been consolidated, when it is found that the transmit probability is 1.0 at one of its corresponding output ports while it is zero at the other corresponding output ports. If the traffic is determined to be consolidated, the main control processor 101 advances to step S83. If not, the main control processor 101 advances to step S84.

(Step S83) To indicate the presence of the selected flow, the main control processor 101 transmits a control packet to each path where no traffic is present. That is, the consolidated flow may have a plurality of such no-traffic paths. The control packet is transmitted to each of those paths to deliver the flow ID of the selected flow and path data describing what path the control packet is supposed to trace. The main control processor 101 may obtain such path data from, for example, the flow management table 120a.

(Step S84) The main control processor 101 determines whether the traffic management table 124-1 includes any other flow. When there is a flow that has not yet been selected, the main control processor 101 goes back to step S81 to select that flow. When there are no such flows, the main control processor 101 advances to step S85.

(Step S85) The main control processor 101 waits for a while until the next cycle of control packet transmission comes.

(Step S86) The main control processor 101 resets every flow to unselected state before going back to step S81.

The above steps transmit control packets to the no-traffic paths produced as a result of traffic consolidation of a flow. This transmission of control packets continues as long as the flow exists. When the flow is found to be extinct, the ingress node, e.g., node 100, of the flow removes relevant records from its traffic management table 124-1. This removal of the records results in no control packets transmitted for the extinct flow.

Figure 31:
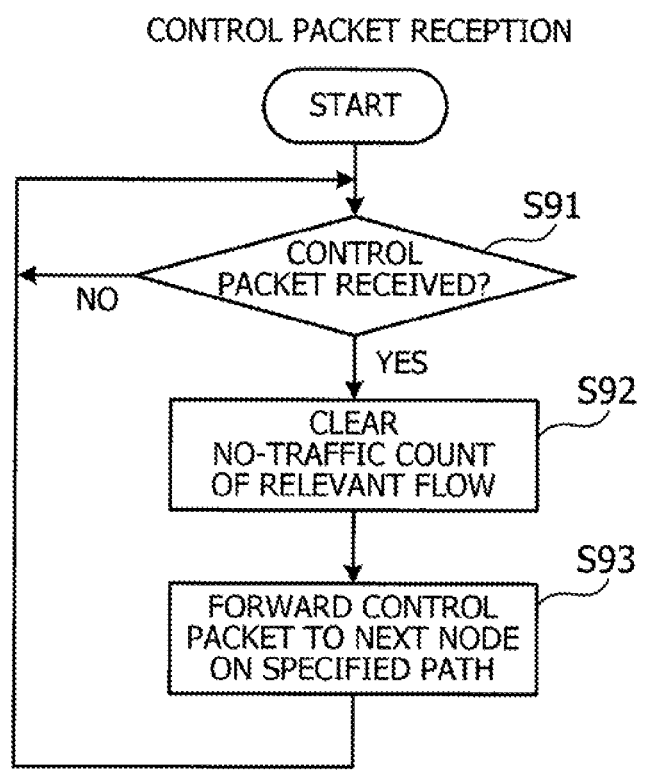
FIG. 31 is a flowchart illustrating the process of receiving control packets according to the fourth embodiment.

The nodes operate as follows when they receive a control packet. FIG. 31 is a flowchart illustrating the process of receiving control packets according to the fourth embodiment. Each step of FIG. 31 will be described below in the order of step numbers, assuming that the node 100 has been serving as a relaying node or egress node for a specific flow and now receives a control packet from some other node.

(Step S91) The main control processor 101 determines whether the node 100 has received a control packet. If there is a received control packet indicating presence of the flow, the advances to step S92. The main control processor 101 repeats step S91 until a control packet is received.

(Step S92) The received control packet indicates a flow ID. The traffic history table corresponding to this flow ID has a data field of no-traffic count. The main control processor 101 clears this no-traffic count to zero in response to the control packet.

(Step S93) The received control packet also contains path data specifying the next node. The main control processor 101 thus forwards the control packet to that node. The main control processor 101 then goes back to step S91.

As can be seen from the above, the node resets the no-traffic count of a flow to zero in response to control packets indicating the presence of that flow. Since the no-traffic count does not exceed a threshold as long as the traffic exists on some other path, the node preserves the corresponding record in the traffic management table 124-1 even if no traffic of the flow enters the node itself. The node is thus able to determine its current operation mode, taking into consideration the significance of flows whose traffic is consolidated into a particular path.

Figure 32:
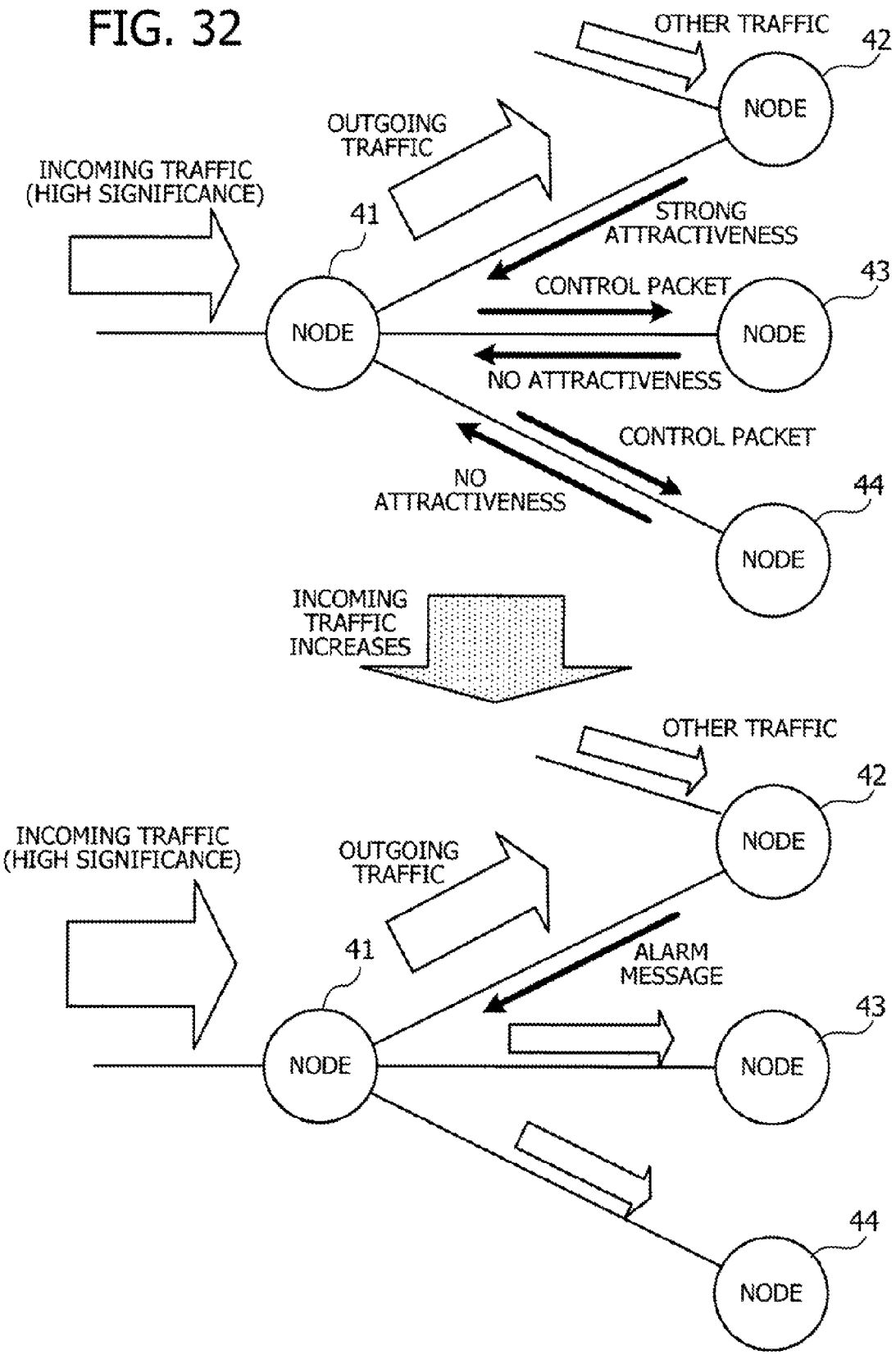
FIG. 32 illustrates a first example of packet transmission according to the fourth embodiment.

FIG. 32 illustrates a first example of packet transmission according to the fourth embodiment. The example of FIG. 32 assumes that one node 41 is an ingress node of a high-significance traffic while the other nodes 42 to 44 are relaying nodes. One relaying node 42 has an additional traffic inflow from another node (not illustrated), whereas the other relaying nodes 43 and 44 receive no other traffic.

Under the illustrated situation, the relaying node 42 indicates its strong attractiveness to the ingress node 41 because of the presence of a fair amount of incoming traffic. On the other hand, the remaining relaying nodes 43 and 44 indicate, for example, zeros to the ingress node 41 as their attractiveness since they have no incoming traffic. Accordingly the ingress node 41 forwards the entire traffic to the former relaying node 42. As no traffic is routed to the latter two relaying nodes 43 and 44, the ingress node 41 sends those relaying nodes and 44 a control packet indicating the presence of incoming traffic of the flow. The relaying nodes 43 and 44 thus maintain their full performance, not entering sleep mode in spite of no incoming traffic.

Suppose now that there is so much increase in the incoming traffic to the ingress node 41 that its subsequent relaying node 42 may possibly experience congestion. The relaying node 42 transmits an alarm message to the ingress node 41 when the amount of incoming traffic reaches a specified threshold before congestion occurs. In response to the alarm message, the ingress node 41 begins dividing the traffic into a plurality of paths, thus producing traffic toward every relaying node 42 to 44. The latter two relaying nodes 43 and 44 handle this new traffic from the ingress node 41 without delays since they have been operating at their full performance level.

Figure 33:
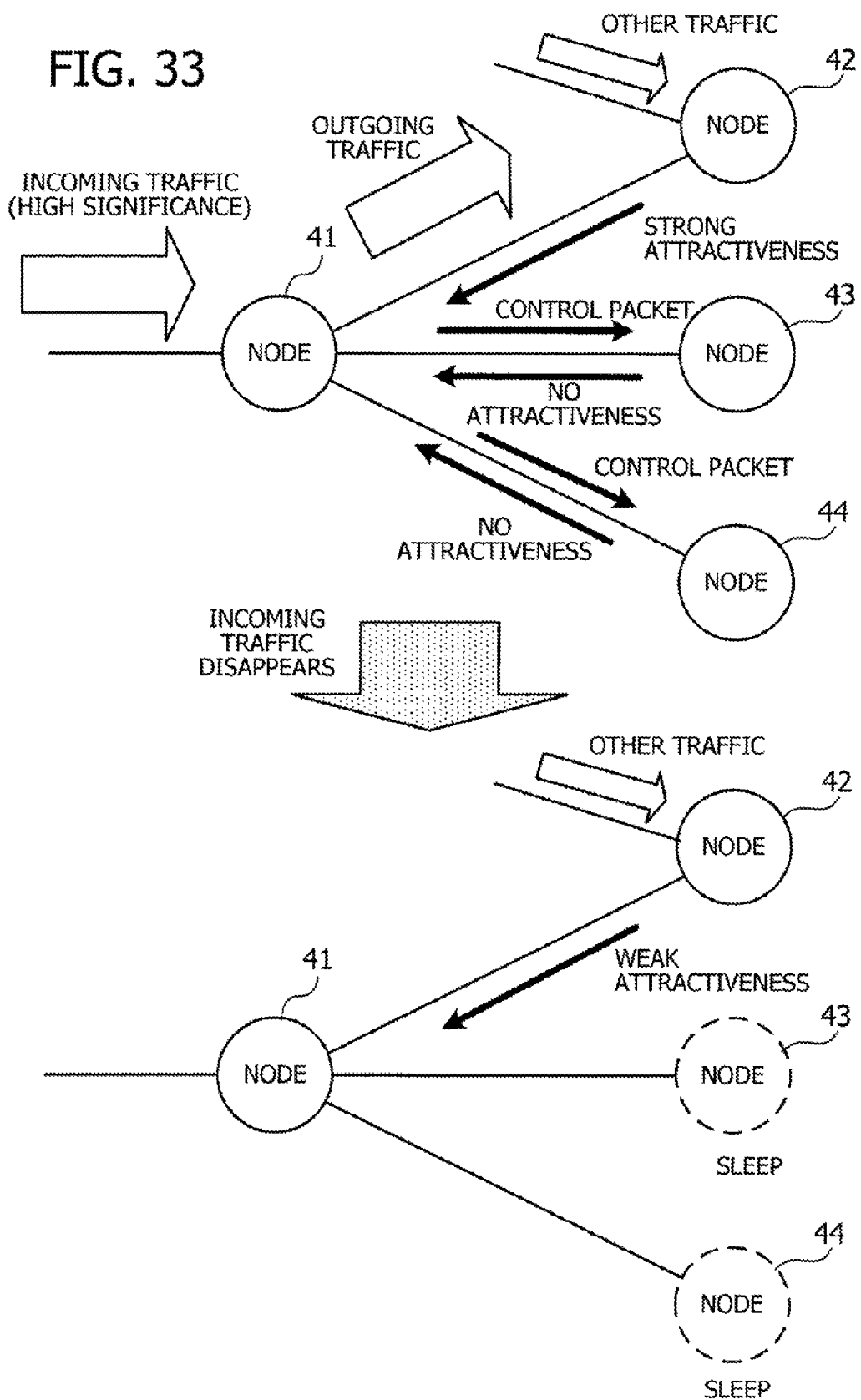
FIG. 33 illustrates a second example of packet transmission according to the fourth embodiment.

FIG. 33 illustrates a second example of packet transmission according to the fourth embodiment. The example of FIG. 33 begins with the same situation as that seen in the upper half of FIG. 32, and it is followed by extinction of the incoming traffic to the ingress node 41. The ingress node 41 in this case sends no control packets to the relaying nodes 43 and 44, allowing them to go into sleep mode upon expiration of a specified time after the incoming traffic is lost. The power consumption of the network is thus reduced.

As can be seen from the above description, the fourth embodiment enables delay-free transport of packets even in the case, for example, where an once-consolidated high-significance flow is divided again into a plurality of traffic paths to avoid congestion. When, on the other hand, the entire traffic of a flow is extinct, the record of that flow is removed from the traffic management table 124-1, so that its significance will no longer affect the decision of current operation mode. These features of the fourth embodiment contribute to realization of a power-efficient network.

(e) Other Embodiments

The foregoing second to fourth embodiments have a traffic measurement unit 170 or 170-1 as part of their network processor 102 or 102-1. Measurement of traffic volumes may, however, be implemented in some other circuit such as the main control processor 101.

The second to fourth embodiments have proposed power management techniques for individual nodes in a network system, where the nodes control consolidation and distribution of traffic autonomously. The embodiments are, however, not limited to such systems. The proposed techniques may also be applied to a system in which the traffic is consolidated or distributed under the centralized control of a single management apparatus. Also the above-described power saving functions may be incorporated into the nodes in a network that does not support the features of traffic consolidation and distribution.

The functions explained in the above-described embodiments may be implemented as computer applications. That is, a computer program or computer programs are provided to implement the functions of the information processing apparatus according to the first embodiment, as well as the functions of a node according to the second to fourth embodiments. A computer executes those programs to provide the processing functions discussed in the preceding sections. The programs may be encoded in a non-transitory computer-readable medium. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of program products. Network-based distribution of computer programs may also be possible, in which case several master program files are made available on a server computer for downloading to other computers via a network.

A computer stores necessary programs in its local storage device, which have previously been installed from a portable storage medium or downloaded from a server computer. The computer executes programs read out of the local storage unit, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuits.

Various embodiments have been described above. As can be seen from the description, the embodiments enable power management that reduces power consumption as effectively as possible, while ensuring the reliability of transmission for quality-demanding data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. An information processing apparatus comprising:
a transmitter that forwards received data;
a memory configured to store power management information that describes what power management is to be performed in each different operation mode and information that specifies performance levels at which the transmitter is to operate in different operation modes in such a way that a wider performance margin is provided against processing load of forwarding received data as the operation mode corresponds to a higher significance; and
a processor configured to perform a procedure comprising:
measuring per-unit-time traffic volume of each flow of data received from a common source and destined for a common destination,
storing log records of each flow in the memory, the log records indicating the per-unit-time traffic volume measured during a specified past period,
calculating the processing load of forwarding received data, based on a sum of maximum per-unit-time traffic volumes of the flows,
determining significance of the received data,
selecting which operation mode to apply from a quality-first mode for making the transmitter operate full performance, a power saving mode for making the transmitter operate with a first performance margin against a load, and a moderate mode for making the transmitter operate with a second performance margin greater than the first performance margin against the load, based on the significance of the received data, and
performing power management of the transmitter, with reference to the stored power management information corresponding to the selected operation mode,
wherein the selecting selects an operation mode corresponding to the highest significance among those of the flows whose traffic during the specified past period is recorded in the log records, and
wherein the performing of power management controls the transmitter in such a way that the transmitter operates at one of the defined performance levels which provides a performance margin depending on the selected operation mode against the calculated processing load.
2. The information processing apparatus according to claim 1, wherein:

the memory further stores information that specifies, for each different operation mode, which circuits are to be stopped when data inflows become extinct; and the performing of power management stops, upon extinction of the data inflows, the circuits specified in the stored information corresponding to the selected operation mode.

3. The information processing apparatus according to claim 2, wherein the information stored in the memory specifies more circuits to be stopped, as the operation mode corresponds to a lower significance of received data.

4. The information processing apparatus according to claim 1, wherein:

the memory further stores information that associates matching patterns of header information of packets with significance of the packets; and the determining of significance finds one of the matching patterns that matches with the header information of packets of the received data and determines the significance of the received data which is associated with the matching pattern that is found.

5. The information processing apparatus according to claim 1, wherein:

the transmitter treats as a flow a series of data received from a common source and destined for a common destination, and forwards traffic of each flow to one or more paths that have previously been determined therefor; and the procedure further comprises sending information indicating the determined significance of a flow to other apparatuses on the paths of the flow.

6. The information processing apparatus according to claim 1, wherein:

the transmitter treats as a flow a series of data received from a common source and destined for a common destination, and forwards traffic of each flow to one or more paths that have previously been determined therefor; and the procedure further comprises sending information indicating presence of traffic of a flow, to other information processing apparatuses on a path that is operable to deliver the flow, but currently carrying no traffic of the flow.

7. A control method executed by a computer, the control method comprising:

measuring per-unit-time traffic volume of each flow of data received from a common source and destined for a common destination, storing log records of each flow in a memory, the log records indicating the per-unit-time traffic volume measured during a specified past period, calculating the processing load of forwarding received data, based on a sum of maximum per-unit-time traffic volumes of the flows, determining significance of received data, selecting which operation mode to apply from a quality-first mode for making the transmitter operate full performance, a power saving mode for making the transmitter operate with a first performance margin against a load, and a moderate mode for making the transmitter operate with a second performance margin greater than the first performance margin against the load, based on the significance of the received data, and performing power management of a transmitter which forwards the received data, with reference to power management information corresponding to the selected operation mode, the power management information describing what power management is to be performed in each different operation mode, wherein the selecting selects an operation mode corresponding to the highest significance among those of the flows whose traffic during the specified past period is recorded in the log records, and wherein the performing of power management controls the transmitter in such a way that the transmitter operates at one of the defined performance levels which provides a performance margin depending on the selected operation mode against the calculated processing load, with reference to information that specifies performance levels at which the transmitter is to operate in different operation modes in such a way that a wider performance margin is provided against processing load of forwarding received data as the operation mode corresponds to a higher significance.

8. A non-transitory computer-readable medium encoded with a computer program, the computer program causing a computer to perform a procedure comprising:

measuring per-unit-time traffic volume of each flow of data received from a common source and destined for a common destination;

storing log records of each flow in a memory, the log records indicating the per-unit-time traffic volume measured during a specified past period;

calculating the processing load of forwarding received data, based on a sum of maximum per-unit-time traffic volumes of the flows;

determining significance of received data;

selecting which operation mode to apply from a quality-first mode for making the transmitter operate full performance, a power saving mode for making the transmitter operate with a first performance margin against a load, and a moderate mode for making the transmitter operate with a second performance margin greater than the first performance margin against the load, based on the significance of the received data; and performing power management of a transmitter which forwards the received data, with reference to power management information corresponding to the selected operation mode, the power management information describing what power management is to be performed in each different operation mode;

wherein the selecting selects an operation mode corresponding to the highest significance among those of the flows whose traffic during the specified past period is recorded in the log records, and wherein the performing of power management controls the transmitter in such a way that the transmitter operates at one of the defined performance levels which provides a performance margin depending on the selected operation mode against the calculated processing load, with reference to information that specifies performance levels at which the transmitter is to operate in different operation modes in such a way that a wider performance margin is provided against processing load of forwarding received data as the operation mode corresponds to a higher significance.

* * * * *